United States Patent
Hayakawa et al.

(10) Patent No.: US 9,349,059 B2
(45) Date of Patent: May 24, 2016

(54) THREE-DIMENSIONAL OBJECT DETECTION DEVICE

(71) Applicant: Nissan Motor Co., Ltd., Yokohama-shi, Kanagawa (JP)

(72) Inventors: Yasuhisa Hayakawa, Yokohama (JP); Osamu Fukata, Commerce Township, MI (US)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/406,817

(22) PCT Filed: Jul. 24, 2013

(86) PCT No.: PCT/JP2013/070010
§ 371 (c)(1),
(2) Date: Dec. 10, 2014

(87) PCT Pub. No.: WO2014/017521
PCT Pub. Date: Jan. 30, 2014

(65) Prior Publication Data
US 2015/0125031 A1    May 7, 2015

(30) Foreign Application Priority Data

Jul. 27, 2012    (JP) ................. 2012-166516

(51) Int. Cl.
*G06K 9/00* (2006.01)
*G06K 9/62* (2006.01)
(Continued)

(52) U.S. Cl.
CPC ........ *G06K 9/00805* (2013.01); *G06K 9/00201* (2013.01); *G06T 7/0042* (2013.01);
(Continued)

(58) Field of Classification Search
None
See application file for complete search history.

(56) References Cited

U.S. PATENT DOCUMENTS

2003/0122930 A1* 7/2003 Schofield ................. B60R 1/00
348/148
2008/0309516 A1* 12/2008 Friedrichs .......... G06K 9/00805
340/935
(Continued)

FOREIGN PATENT DOCUMENTS

CN    102473281 A    5/2012
JP    2007-58318 A    3/2007
(Continued)

OTHER PUBLICATIONS

Hans-Hellmut Nagel, "Reflections on Cognitive Vision Systems," Grid and cooperative computing—GCC 2004: third international conference, Wuhan, China, Jan. 2003, pp. 34-43, vol. 2626, Springer Verlag, Germany.

*Primary Examiner* — Matthew Bella
*Assistant Examiner* — Jose M Torres
(74) *Attorney, Agent, or Firm* — Global IP Counselors, LLP

(57) ABSTRACT

A three-dimensional object detection has an image capturing device, a three-dimensional object detection unit, a high-luminance area assessment unit and a controller. The image capturing device captures images of an area including a right-side detection area or a left-side detection area rearward of a vehicle. The three-dimensional object detection unit detects a three-dimensional object based on the images acquired by the image capturing device. The high-luminance area assessment unit accesses a first detection area including a high-luminance area complying with a predetermined reference on either the right-side detection area or the left-side detection area. The controller suppresses detection of the three-dimensional object based on image information of the first detection area that was detected, and maintains or promotes detection of the three-dimensional object based on image information of a second detection area other than the first detection area within the right-side detection area or the left-side detection area.

12 Claims, 23 Drawing Sheets

(51) Int. Cl.
*G06K 9/34* (2006.01)
*G06T 7/00* (2006.01)
*G08G 1/16* (2006.01)

(52) U.S. Cl.
CPC .............. *G08G 1/166* (2013.01); *G08G 1/167* (2013.01); *G06T 2207/10016* (2013.01); *G06T 2207/20224* (2013.01); *G06T 2207/30261* (2013.01)

(56) References Cited

U.S. PATENT DOCUMENTS

| | | | |
|---|---|---|---|
| 2009/0268027 A1 | 10/2009 | Yang | |
| 2009/0303356 A1* | 12/2009 | Min | H04N 5/3591 348/241 |
| 2011/0074957 A1* | 3/2011 | Kiyohara | G06K 9/342 348/148 |
| 2011/0234761 A1 | 9/2011 | Yumiba et al. | |
| 2011/0310245 A1* | 12/2011 | Tsuchiya | G01S 11/12 348/135 |
| 2012/0308082 A1* | 12/2012 | Murao | G06K 9/00825 382/103 |
| 2012/0320213 A1* | 12/2012 | Ikeda | B60R 1/00 348/148 |
| 2013/0027511 A1* | 1/2013 | Takemura | G06K 9/00805 348/42 |

FOREIGN PATENT DOCUMENTS

| | | |
|---|---|---|
| JP | 2008-219063 A | 9/2008 |
| JP | 2008-227646 A | 9/2008 |
| JP | 2010-256995 A | 11/2010 |
| JP | 2012-3662 A | 1/2012 |
| JP | 2012-138828 A | 7/2012 |
| WO | 2012/023412 A1 | 2/2012 |

* cited by examiner

THREE-DIMENSIONAL OBJECT DETECTION DEVICE

CROSS-REFERENCE TO RELATED APPLICATIONS

This application is a U.S. National stage application of International Application No. PCT/JP2013/070010, filed Jul. 24, 2013, which claims priority to Japanese Patent Application No. 2012-166516 filed in Japan on Jul. 27, 2012. The entire disclosure of Japanese Patent Application No. 2012-166516 is hereby incorporated herein by reference.

BACKGROUND

1. Field of the Invention

The present invention relates to a three-dimensional object detection device.

2. Background Information

There is known an obstacle detection device in which images captured in the periphery of a vehicle are converted to bird's-eye views and a difference between two images converted to bird's-eye views differing over time is used to detect obstacles (Japanese Laid-Open Patent Application No. 2008-227646).

SUMMARY

When using an image captured at the rear of a vehicle to detect as an obstacle another vehicle traveling in an adjacent lane adjacent to a lane in which a host vehicle is traveling, and when executing processing to detect a three-dimensional object with the same conditions for an area of a bright environment illuminated by the sun or other intense light and an area of a dark environment being in the shadow of the host vehicle, another vehicle, or other object, although the precision of detection of the three-dimensional object can be improved in either the bright environment or the dark environment, there is a problem that the precision of detection of the three-dimensional object decreases in the other environment.

Specifically, in a bright environment in which sunlight coming into the detection area is reflected on the road surface, the brightness of a reflection image (virtual image) formed by reflection of the sunlight or other intense light on the road surface exceeds a threshold value of brightness for detecting a three-dimensional object, and the image may be erroneously detected as a three-dimensional object. On the other hand, in a dark environment in which incoming sunlight or other light is blocked by another vehicle, or the like, the brightness of the captured image decreases, the brightness of an image (real image) of another vehicle actually present does not exceed the threshold value of brightness for detecting a three-dimensional object, and the image may be erroneously detected as not being a three-dimensional object.

An object of the present invention is to provide a three-dimensional object detection device that prevents erroneous detection of a reflection image (virtual image) due to sunlight or other intense light formed in the detection area of a bright environment as an image (real image) of another vehicle traveling in an adjacent lane adjacent to the lane in which a host vehicle is traveling, and detects another vehicle traveling in the adjacent lane, under circumstances in which a detection area of a bright environment and a detection area of a dark environment are formed.

The present invention achieves the abovementioned object by suppressing assessment that a three-dimensional object is another vehicle based on image information of a first detection area including a high-luminance area within a right-side detection area or a left-side detection area, and by maintaining or promoting assessment that a three-dimensional object is another vehicle based on image information of a second detection area other than the first detection area.

According to the present invention, erroneous detection of a reflection image (virtual image) of sunlight as an image (real image) of another vehicle traveling in an adjacent lane adjacent to a lane in which a host vehicle is traveling can be prevented with respect to a first detection area having a bright environment, and erroneous detection of an image (real image) of another vehicle actually present in an adjacent lane as not being another vehicle can be prevented with respect to a second detection area having a relatively dark environment, when brightness environments differ between a right-side detection area and a left-side detection area. A three-dimensional object detection system that detects with high precision another vehicle traveling in an adjacent lane adjacent to a lane in which a host vehicle is traveling can be provided as a result.

BRIEF DESCRIPTION OF THE DRAWINGS

Referring now to the attached drawings which form a part of this original disclosure.

DETAILED DESCRIPTION OF THE EMBODIMENTS

Figure 1:
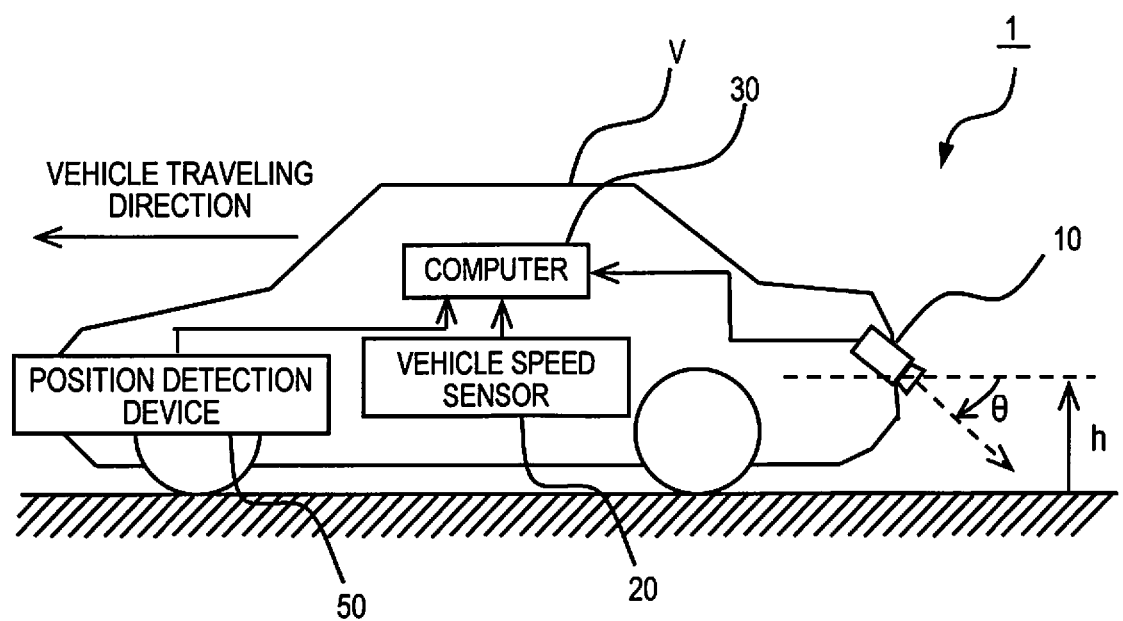
FIG. 1 is a schematic overview of a vehicle according to one embodiment in which the three-dimensional object detection device of the present invention is applied.

FIG. 1 is a schematic overview of a vehicle according to one embodiment in which the three-dimensional object detection device 1 of the present invention is applied. The three-dimensional object detection device 1 of the present example is a device for detecting as an obstacle another vehicle to which the driver of the host vehicle V should be paying attention during driving, for example, another vehicle with which there is a possibility of contact when the host vehicle V changes lanes. In particular, the three-dimensional object detection device 1 of the present example is used for detecting another vehicle traveling in an adjacent lane adjacent to the lane in which the host vehicle is traveling (hereinbelow also referred to simply as "adjacent lane"). The three-dimensional object detection device 1 of the present example also can calculate a travel distance and a traveling speed of the other vehicle detected. The example described below therefore is an example in which the three-dimensional object detection device 1 is mounted on the host vehicle V and is used for detecting another vehicle traveling in an adjacent lane adjacent to the lane in which the host vehicle V is traveling, among three-dimensional objects detected in the periphery of the host vehicle. As illustrated in the same view, the three-dimensional object detection device 1 of the present example is provided with a camera 10, a speed sensor 20, a computer 30, and a position detection device 50.

The camera 10 is attached to the host vehicle V toward the rear of the host vehicle V in a place at a height h and is arranged so that the optical axis is brought downward at an angle θ from horizontal, as illustrated in FIG. 1. The camera 10 captures an image of a predetermined area within the peripheral environment of the host vehicle V from this position. In the present embodiment, one camera 10 is provided to detect a three-dimensional object toward the rear of the host vehicle V, but another camera can be provided for another use, for example, to acquire an image in the periphery of the vehicle. The speed sensor 20 detects a traveling speed of the host vehicle V, for example, the vehicle speed is calculated from a wheel speed detected by a wheel speed sensor for sensing a rotation number on a wheel. The computer 30 detects a three-dimensional object toward the rear of the vehicle, and, in the present example, calculates a travel distance and a traveling speed with respect to the three-dimensional object. The position detection device 50 detects a travel position of the host vehicle V.

Figure 2:
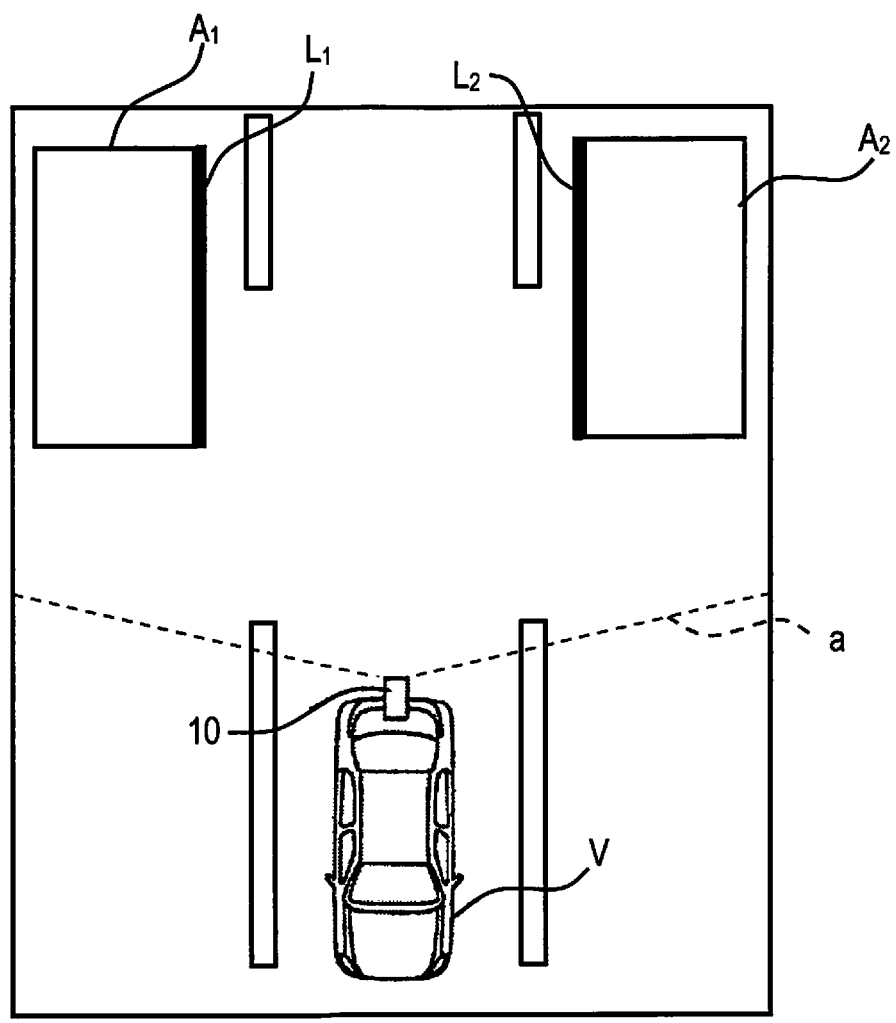
FIG. 2 is a plan view illustrating a traveling state of the vehicle in FIG. 1.

FIG. 2 is a plan view illustrating a traveling state of the host vehicle V in FIG. 1. As illustrated in the same view, the camera 10 captures an image on the rear side of the vehicle at a predetermined angle a. At this time, the view angle a of the camera 10 is set to a view angle at which an image can be captured in the left and right lanes as well as the lane in which the host vehicle V is traveling. The area in which an image can be captured includes detection object lanes A1 and A2 toward the rear of the host vehicle V and on adjacent lanes adjacent on the left and right to the lane in which the host vehicle V is traveling. Toward the rear of the vehicle in the present embodiment includes not only directly behind the vehicle but also toward the side at the rear side of the vehicle. The area toward the rear of the vehicle in which an image is captured is set in accordance with the view angle of the camera 10. Also this is one example, the angle can be set so as to include an area of 0 degrees to 90 degrees, preferably 0 degrees to 70 degrees, or the like, from directly behind, when directly behind the vehicle following the vehicle length direction is zero degrees.

Figure 3:
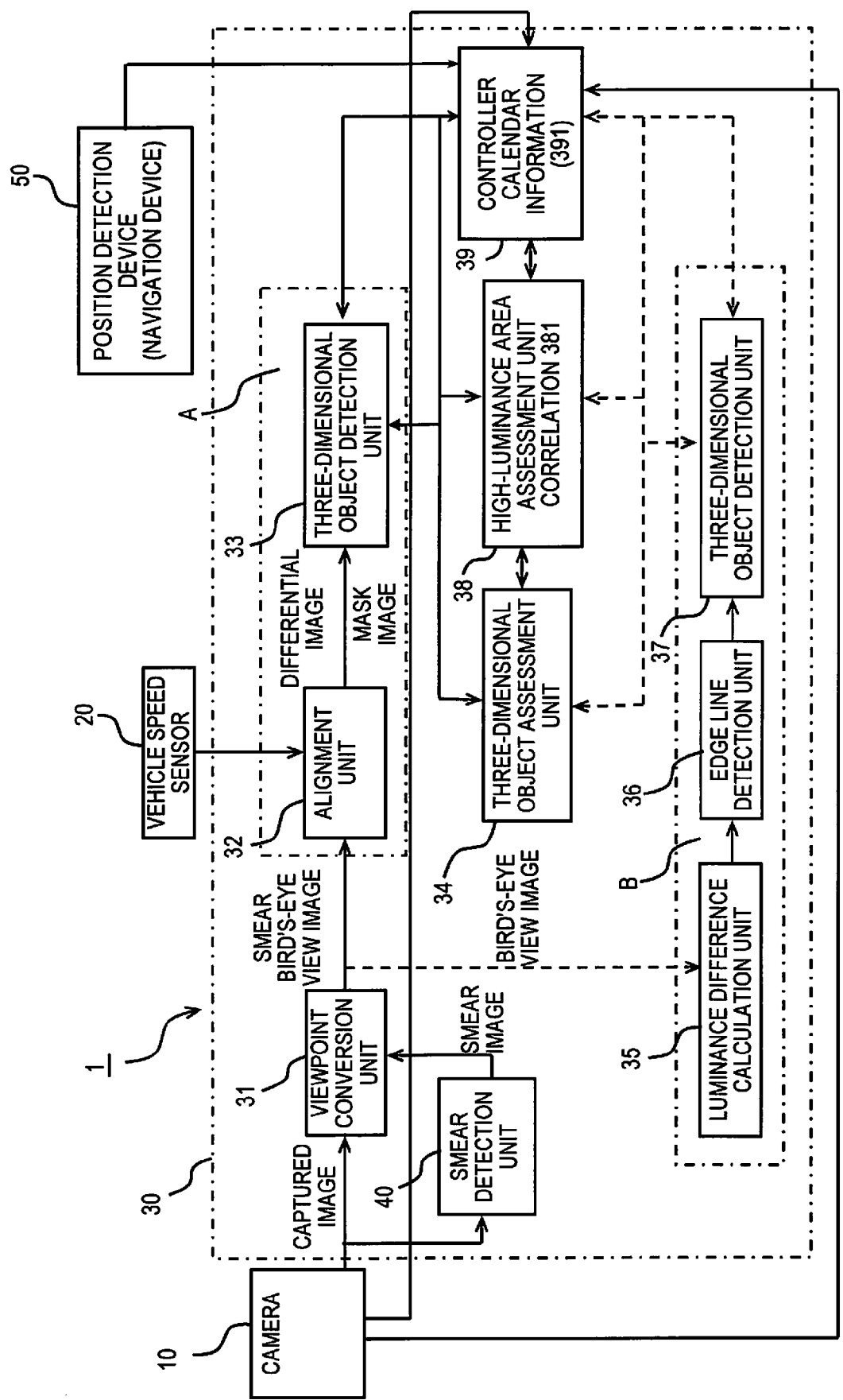
FIG. 3 is a block diagram illustrating details of the computer in FIG. 1.

FIG. 3 is a block view illustrating details of the computer 30 in FIG. 1. In FIG. 3, the camera 10, the speed sensor 20, and the position detection device 50 also are illustrated for clarification of the connection relationship.

As illustrated in FIG. 3, the computer 30 is provided with a viewpoint conversion unit 31, an alignment unit 32, a three-dimensional object detection unit 33, a three-dimensional object assessment unit 34, a high-luminance area assessment unit 38, a controller 39, and a smear detection unit 40. The computer 30 of the present embodiment is configured in relation to a block for detecting a three-dimensional object utilizing differential waveform information. The computing unit 30 of the present invention can be configured also in relation to a block for detecting a three-dimensional object utilizing edge information. In this case, in the configuration illustrated in FIG. 3, configuration is possible by replacing the block configuration A configured with the alignment unit 32 and three-dimensional object detection unit 33 with the block configuration B configured with the luminance difference calculation unit 35, edge line detection unit 36, and three-dimensional object detection unit 37 surrounded by the discontinuous lines. As shall be apparent, both the block configuration A and the block configuration B can be provided so as to be able to perform detection of a three-dimensional object utilizing differential waveform information as well as detection of a three-dimensional object utilizing edge information. When the block configuration A and the block configuration B are provided, either the block configuration A or the block configuration B can be operated, for example, in accordance with brightness or other environmental factors. Each configuration is described below.

Detection of Three-Dimensional Object by Differential Waveform Information

The three-dimensional object detection device 1 of the present embodiment is used for detecting a three-dimensional object present in a right-side detection area or a left-side detection area rearward from the vehicle based on image information obtained by a single lens reflex camera for capturing an image rearward from the vehicle.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, for example, vertically downward. Viewpoint conversion can be carried out in the manner described in, for example, Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be distinguished. The result of image conversion processing carried out by the viewpoint conversion unit 31 is utilized also in detection of a three-dimensional object using edge information to be described later.

Figure 4:
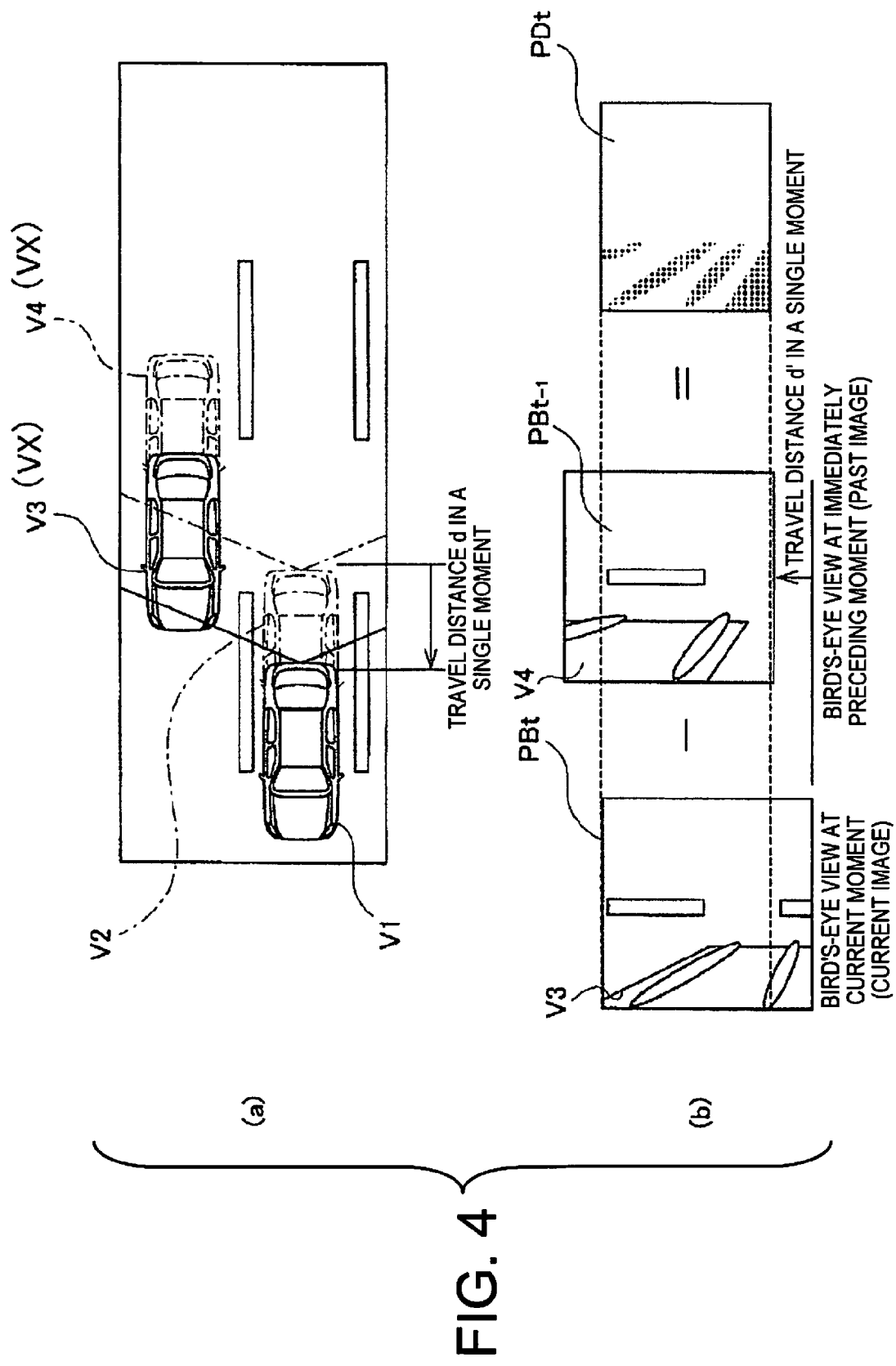
FIG. 4 is a view for describing a general overview of processing of the alignment unit in FIG. 3, with part (a) of FIG. 4 being a plan view illustrating a traveling state of the vehicle, and part (b) of FIG. 4 being an image illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different points in time are aligned. FIG. 4 is a view for describing a general overview of processing of the alignment unit 32. Part (a) of FIG. 4 is a plan view illustrating a traveling state of the host vehicle V, and part (b) of FIG. 4 is an image illustrating a general overview of alignment.

As illustrated in part (a) of FIG. 4, the host vehicle V at the current moment is positioned at V1, and the host vehicle V at a single moment prior is positioned at V2. It is assumed that another vehicle VX is positioned in the rear-side direction of the host vehicle V and is traveling parallel to the host vehicle V, and that the other vehicle VX at the current moment is positioned at V3 and the other vehicle VX at a single moment prior is positioned at V4. It is furthermore assumed that the host vehicle V has moved a distance d in a single moment. The phrase "at a single moment prior" may be a moment in the past by a time set in advance (for example, a single control cycle) from the current moment, or may be a moment in the past by an arbitrary time.

In such a state, a bird's-eye view image $PB_t$ at the current moment becomes as illustrated in part (b) of FIG. 4. The white lines drawn on the road surface are rectangular in this bird's-eye view image $PB_t$ and are relatively accurate in a planar view, but the other vehicle VX in position V3 is collapsed. The same applies to the bird's-eye view image $PB_{t-1}$ at a single moment prior; the white lines drawn on the road surface are rectangular and are relatively accurate in a planar view, but the other vehicle VX in position V4 is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a travel distance d'. The offset amount d' is the amount of movement in the bird's-eye view image data that corresponds to the actual travel distance d of the host vehicle V illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates differential image $PD_t$ data. Here, the pixel values of the differential image $PD_t$ may be taken as the absolute value of the difference in the pixel values of the bird's-eye view images $PB_t$ and $PB_{t-1}$, or may be set to "1" when the absolute value exceeds a predetermined threshold value p, or to "0" when the absolute value does not exceed the threshold value, in order correspond to variation in the illumination environment. The right-side image in part (b) of FIG. 4 illustrates the differential image $PD_t$. The threshold value p can be set in advance.

Returning to FIG. 3, the three-dimensional object detection unit 33 detects a three-dimensional object based on the differential image $PD_t$ data illustrated in part (b) of FIG. 4. In this case, the three-dimensional object detection unit 33 of the present example calculates the travel distance of the three-dimensional object in actual space. The three-dimensional object detection unit 33 first generates a differential waveform when the three-dimensional object is detected and the travel distance is to be calculated. The travel distance over time of the three-dimensional object is used for calculating the traveling speed of the three-dimensional object. The traveling speed of the three-dimensional object also can be used for assessing whether the three-dimensional object is a vehicle.

In generating the differential waveform, the three-dimensional object detection unit 33 of the present embodiment sets a detection area in the differential image $PD_t$. The three-dimensional object detection device 1 of the present example is a device for detecting as an object to be detected another vehicle to which the driver of the host vehicle V should be paying attention, for example, another vehicle, traveling in a lane adjacent to the lane in which the host vehicle V is traveling, with which there is a possibility of contact when the host vehicle V changes lanes. Therefore, in the present example in which a three-dimensional object is detected based on image information, two detection areas are set on the right side and the left side of the host vehicle V within the image obtained by the camera 10. Specifically, in the present embodiment, rectangular detection areas A1 and A2 are set on the left and right sides behind the host vehicle V, as illustrated in FIG. 2. Another vehicle detected in these detection areas A1 and A2 is detected as an obstacle traveling in an adjacent lane adjacent to the lane in which the host vehicle V is traveling. Such detection areas A1 and A2 may be set from a relative position to the host vehicle V, or may be set based on the position of the white lines. When set based on the position of the white lines, the three-dimensional object detection device 1 may use, for example, known white line recognition techniques.

The three-dimensional object detection unit 33 recognizes as ground lines L1, L2 (FIG. 2) the borders of the detection areas A1 and A2 thus set, on the host vehicle V side (side along the traveling direction). Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line assessed from the position of the other vehicle VX is not exceedingly great as assessed by experience, and there is no problem in actuality.

Figure 5:
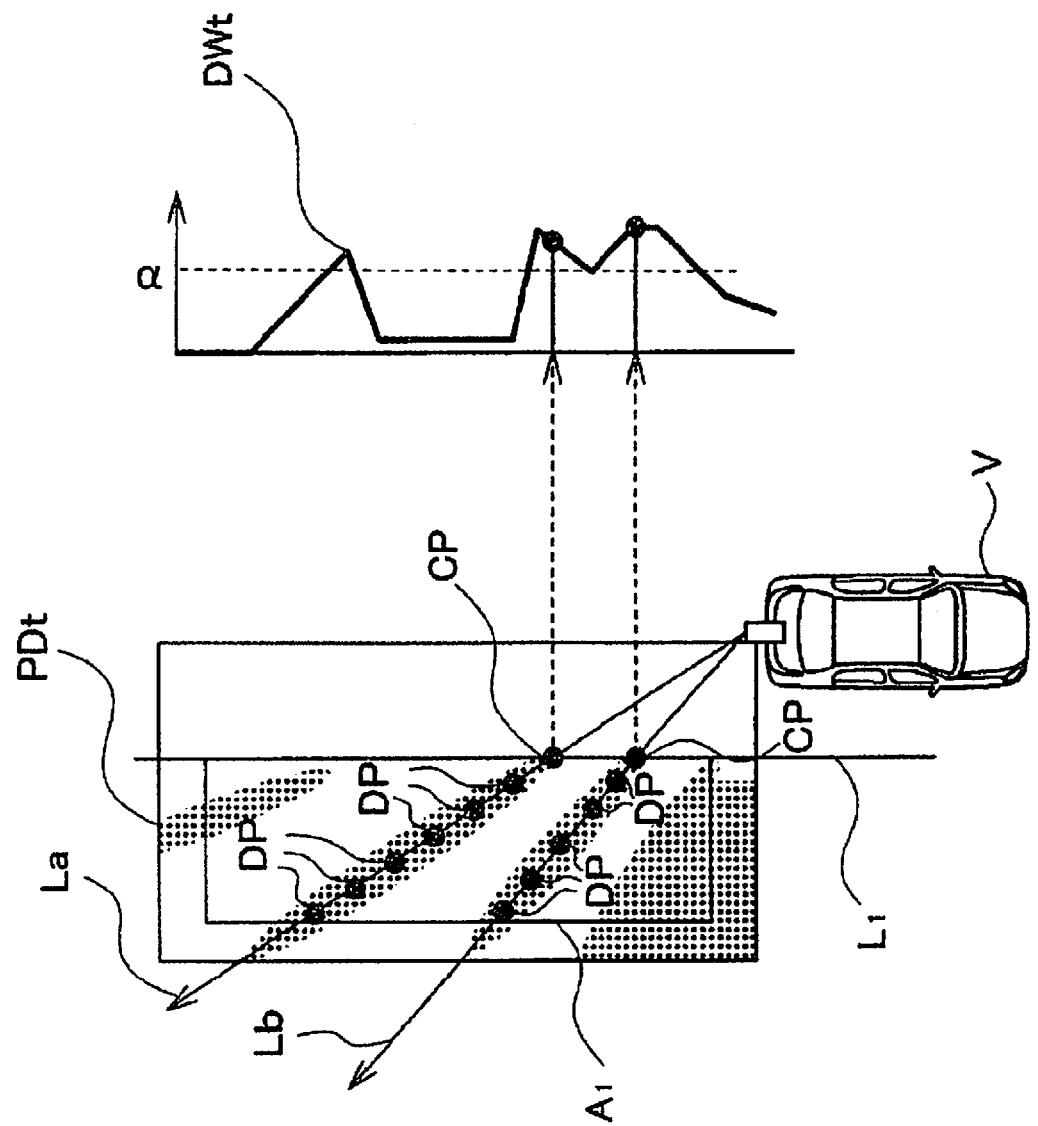
FIG. 5 is a schematic view illustrating the manner of generation of a differential waveform by the three-dimensional object detection unit in FIG. 3.

FIG. 5 is a schematic view illustrating the manner of generation of a differential waveform by the three-dimensional object detection unit 33 in FIG. 3. As illustrated in FIG. 5, the three-dimensional object detection unit 33 generates a differential waveform $DW_t$ from the portion that corresponds to the detection areas A1 and A2 in the differential image $PD_t$ (drawing on the right in part (b) of FIG. 4) calculated by the alignment unit 32. In this case, the three-dimensional object detection unit 33 generates a differential waveform $DW_t$ along the direction in which the three-dimensional object collapses by viewpoint conversion. In the example illustrated in FIG. 5, only the detection area A1 will be described for the sake of convenience, but the differential waveform $DW_t$ is generated for the detection area A2 as well using the same procedure.

More specifically, first, the three-dimensional object detection unit 33 defines a line La in the direction in which the three-dimensional object collapses in the differential waveform $PD_t$ data. The three-dimensional object detection unit 33 then counts the number of difference pixels DP indicating a predetermined difference on the line La. Here, the difference pixels DP indicating the predetermined distance are pixels exceeding a predetermined threshold value when the pixel values of the differential waveform $PD_t$ are taken as the absolute value of the difference in the pixel values of the bird's-eye view images $PB_t$ and $PB_{t-1}$, and are pixels indicating "1" when the pixels values of the differential waveform $PD_t$ are expressed as "0" and "1."

The three-dimensional object detection unit 33 counts the number of difference pixels DP, and thereafter assesses the crossing point CP of the line La and the ground line L1. The three-dimensional object detection unit 33 then correlates the crossing point CP and the count number, decides the horizontal-axis position, that is, the position on the axis in the longitudinal direction in the drawing on the right in FIG. 5, based on the position of the crossing point CP, decides the vertical-axis position, that is, the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a differential waveform $DW_t$ as illustrated in the drawing on the right in FIG. 5.

The lines La and Lb in the direction in which the three-dimensional object collapses have different distances that overlap the detection area A1, as illustrated in the drawing on the left in FIG. 5. Therefore, the number of difference pixels DP is greater on the line La than on the line Lb when it is assumed that the detection area A1 is filled with the difference pixels DP. For this reason, the three-dimensional object detection unit 33 performs normalization based on the distance that the lines La and Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Therefore, when the vertical-axis position is decided from the count number in FIG. 5, the three-dimensional object detection unit 33 divides the count number by the overlapping distance or performs normalization in another manner. The values of the differential waveform $DW_t$ that correspond to the lines La and Lb in the direction in which the three-dimensional object collapses are thereby made substantially the same.

After the differential waveform $DW_t$ has been generated, the three-dimensional object detection unit 33 calculates the travel distance by comparing with the differential waveform $DW_{t-1}$ at a single moment prior. In other words, the three-dimensional object detection unit 33 calculates the travel distance from the change in time of the differential waveforms $DW_t$ and $DW_{t-1}$.

Figure 6:
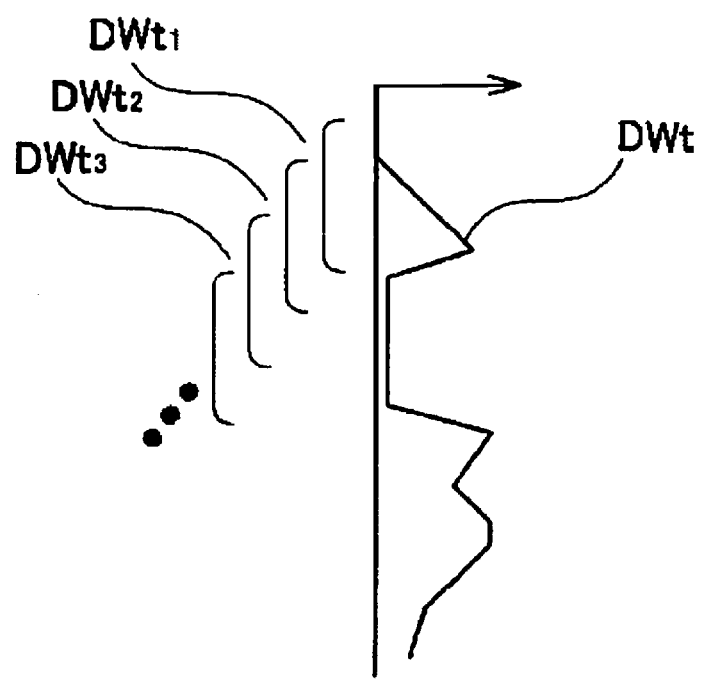
FIG. 6 is a view illustrating small areas divided by the three-dimensional object detection unit in FIG. 3.

More specifically, the three-dimensional object detection unit 33 divides the differential waveform $DW_t$ into a plurality of small areas $DW_{t1}$ to $DW_{tn}$ (where n is an arbitrary integer of 2 or greater), as illustrated in FIG. 6. FIG. 6 is a view illustrating small areas $DW_{t1}$ to $DW_{tn}$ divided by the three-dimensional object detection unit 33. The small areas $DW_{t1}$ to $DW_{tn}$ are divided so as to be mutually overlapping as illustrated in, for example, FIG. 6. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 assesses the offset amount (the amount of movement in the horizontal-axis direction (longitudinal direction in FIG. 6) of the differential waveform) for each of the small areas $DW_{t1}$ to $DW_{tn}$. Here, the offset amount is assessed from the difference (distance in the horizontal-axis direction) between the differential waveform $DW_{t-1}$ at a single moment prior and the differential waveform $DW_t$ at the current moment. In this case, the three-dimensional object detection unit 33 moves the differential waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the differential waveform $DW_t$ at the current moment is at a minimum, and assesses as the offset amount the amount of movement in the horizontal-axis direction between the original position of the differential waveform $DW_{t-1}$ and the position in which the error is at a minimum. The three-dimensional object detection unit 33 then counts the offset amount assessed for each of the small areas $DW_{t1}$ to $DW_{tn}$ and forms a histogram.

Figure 7:
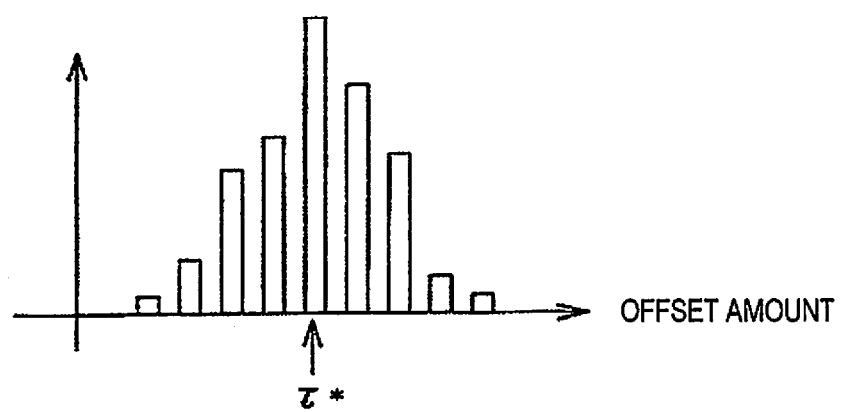
FIG. 7 is a view illustrating an example of a histogram obtained by the three-dimensional object detection unit in FIG. 3.

FIG. 7 is a view illustrating an example of a histogram obtained by the three-dimensional object detection unit 33. As illustrated in FIG. 7, some amount of variability occurs in the offset amount, which is the amount of movement in which the error between the small areas $DW_{t1}$ to $DW_{tn}$ and the differential waveform $DW_{t-1}$ at a single moment prior is at a minimum. Therefore, the three-dimensional object detection unit 33 forms the offset amounts including the variability into a histogram and calculates the travel distance from the histogram. At this point, the three-dimensional object detection unit 33 calculates the travel distance of the three-dimensional object from the maximum value in the histogram. In other words, in the example illustrated in FIG. 7, the three-dimensional object detection unit 33 calculates the offset amount indicating the maximum value of the histogram as the travel distance $\tau^*$. The travel distance $\tau^*$ is the relative travel distance of the other vehicle VX in relation to the host vehicle V. Therefore, the three-dimensional object detection unit 33 calculates the absolute travel distance based on the travel distance $\tau^*$ thus obtained and the signal from the speed sensor 20 when the absolute travel distance is to be calculated.

Figure 8:
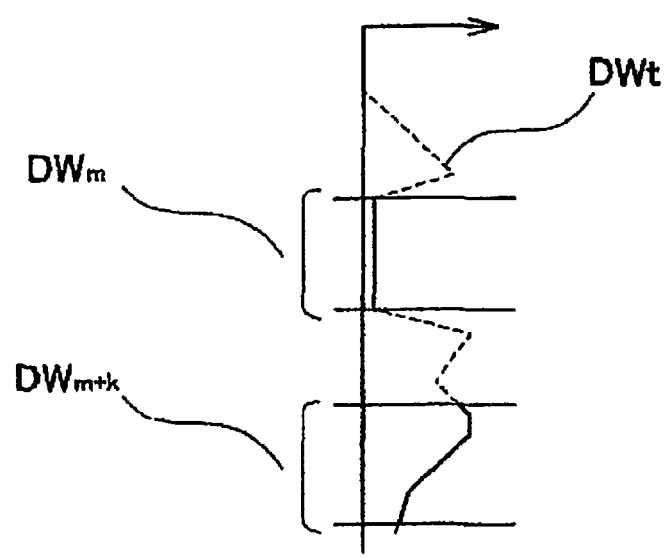
FIG. 8 is a view illustrating weighting performed by the three-dimensional object detection unit in FIG. 3.

When a histogram is to be formed, the three-dimensional object detection unit 33 may impart a weighting to the plurality of small areas $DW_{t1}$ to $DW_{tn}$, and count the offset amounts assessed for each of the small areas $DW_{t1}$ to $DW_{tn}$ in accordance with the weighting to form a histogram. FIG. 8 is a view illustrating weighting performed by the three-dimensional object detection unit 33.

As illustrated in FIG. 8, a small area $DW_m$ (where m is an integer 1 or greater and n−1 or less) is flat. In other words, in the small area $DW_m$, there is little difference between the maximum and minimum values of the count of number of pixels indicating a predetermined difference. The three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer n−m or less) has abundant undulation. In other words, in the small area $DW_m$, there is considerable difference between the maximum and minimum values of the count of number of pixels indicating a predetermined difference. The three-dimensional object detection unit 33 increases the weighting of this type of small area $DW_m$. This is because the small area $DW_{m+k}$ abundant in undulation is characteristic and there is a high possibility that the offset amount will be accurately calculated. Weighting the small areas in this manner makes it possible to improve the precision of calculating the travel distance.

The differential waveform $DW_t$ is divided into a plurality of small areas $DW_{t1}$ to $DW_{tn}$ in the present embodiment in order to improve the precision of calculating the travel distance, but division into the small areas $DW_{t1}$ to $DW_{tn}$ is not required when the precision of calculating travel distance is not so needed. In this case, the three-dimensional object detection unit 33 calculates the travel distance from the offset amount of the differential waveform $DW_t$ when the error between the differential waveform $DW_t$ and the differential waveform $DW_{t-1}$ is at a minimum. In other words, the method for assessing the offset amount between the differential waveform $DW_{t-1}$ at a single moment prior and the differential waveform $DW_t$ at the current moment is not limited to the details described above.

Returning to FIG. 3, the computer 30 is provided with a smear detection unit 40. The smear detection unit 40 generates a smear from data of a captured image obtained by capturing carried out by the camera 10. Because a smear is a white streak phenomenon produced by a CCD image sensor, or the like, the smear detection unit 40 may be omitted when using a camera 10 using a CMOS image sensor, or the like, which does not produce such smear.

Figure 9:
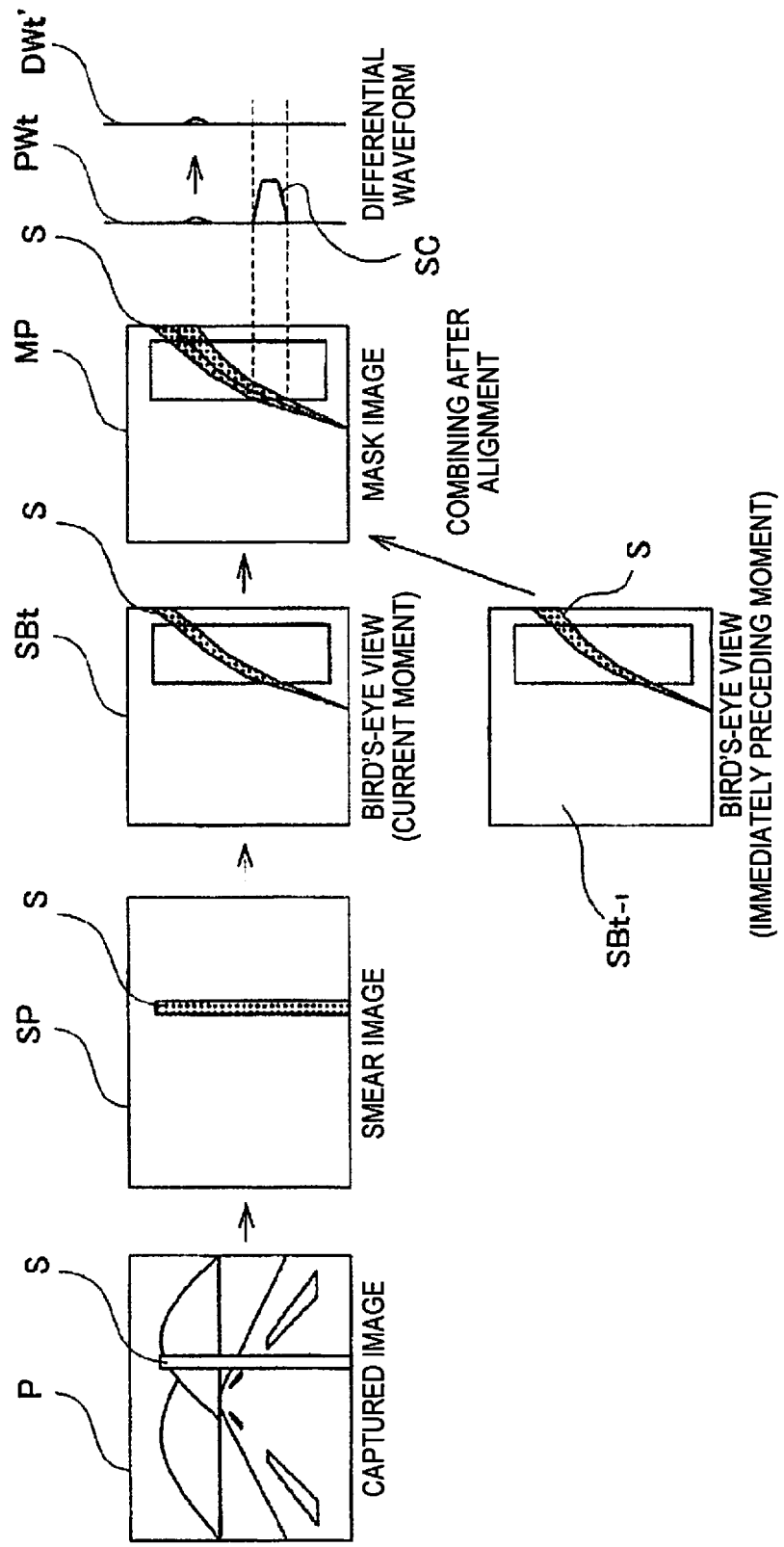
FIG. 9 is a view illustrating processing performed by the smear detection unit in FIG. 3 and calculation processing of a differential waveform based thereon.

FIG. 9 is a view illustrating processing performed by the smear detection unit 40 and calculation processing of a differential waveform $DW_t$ based thereon. First, data of a captured image P having a smear S is inputted to the smear detection unit 40. At this time, the smear detection unit 40 detects the smear S from the captured image P. There are a variety of methods for detecting smear S, but, for example, in the case of a common CCD (Charge-Coupled Device) camera, a smear S is produced only in the downward direction from the light source. Therefore, in the present embodiment a search is carried out from the lower side of the image upward for an area having a luminance value greater than or equal to a predetermined value and continuing in the vertical direction, and this is identified as an area of occurrence of a smear S.

The smear detection unit 40 generates data of a smear image SP, setting a pixel value to "1" for a location of occurrence of the smear S and "0" for other locations. After generation, the smear detection unit 40 sends the smear image SP data to the viewpoint conversion unit 31. The viewpoint conversion unit 31 having inputted the smear image SP data converts the data to a state in bird's-eye view. The viewpoint conversion unit 31 thereby generates data of a smear bird's-eye view image $SB_t$. The viewpoint conversion unit 31 sends data of the smear bird's-eye view image $SB_t$ to the alignment unit 33. The viewpoint conversion unit 31 also sends data of a smear bird's-eye view image $SB_{t-1}$ of a single moment prior to the alignment unit 33.

The alignment unit 32 aligns the smear bird's-eye view images $SB_t$ and $SB_{t-1}$ on the data. The specific alignment is the same as when aligning the bird's-eye view images $PB_t$ and $PB_{t-1}$ on the data. After alignment, the alignment unit 32 logically sums the areas of occurrence of each of the smears S on the smear bird's-eye view images $SB_t$ and $SB_{t-1}$. The alignment unit 32 thereby generates data of a mask image MP. After generation, the alignment unit 32 sends the mask image MP data to the three-dimensional object detection unit 33.

The three-dimensional object detection unit 33 sets a count number of the frequency distribution to zero for a location that corresponds to an area of occurrence of a smear S in the mask image MP. In other words, when a differential waveform $DW_t$ as illustrated in FIG. 9 is generated, the three-dimensional object detection unit 33 sets the count number SC according to the smear S to zero, and generates a corrected differential waveform $DW_t'$.

The three-dimensional object detection unit 33 in the present embodiment assesses the traveling speed of the host vehicle V (camera 10) and assesses the offset amount for a stationary object from the assessed traveling speed. After the offset amount of the stationary object has been assessed, the three-dimensional object detection unit 33 ignores the offset amount that corresponds to the stationary object within the maximum value of the histogram, and calculates the travel distance of the three-dimensional object.

Figure 10:
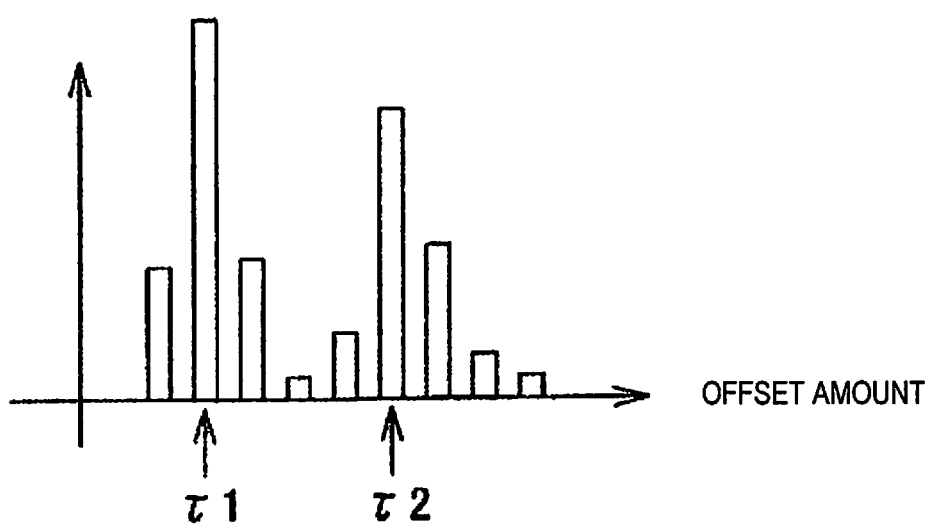
FIG. 10 is a view illustrating another example of a histogram obtained by the three-dimensional object detection unit in FIG. 3.

FIG. 10 is a view illustrating another example of a histogram obtained by the three-dimensional object detection unit 33. When a stationary object other than the other vehicle VX is present within the view angle of the camera 10, two maximum values $\tau1$ and $\tau2$ appear in the resulting histogram. In this case, one of the two maximum values $\tau1$ and $\tau2$ is the offset amount of the stationary object. Therefore, the three-dimensional object detection unit 33 assesses the offset amount for the stationary object from the traveling speed, ignores the maximum value that corresponds to the offset amount, and calculates the travel distance of the three-dimensional object using the remaining maximum value.

Even when the offset amount corresponding to the stationary object is ignored, there may be a plurality of other vehicles VX present within the view angle of the camera 10 when there is a plurality of maximum values. However, a plurality of other vehicles VX present within the detection areas A1 and A2 occurs very rarely. Therefore, the three-dimensional object detection unit 33 stops calculating the travel distance.

Figure 11:
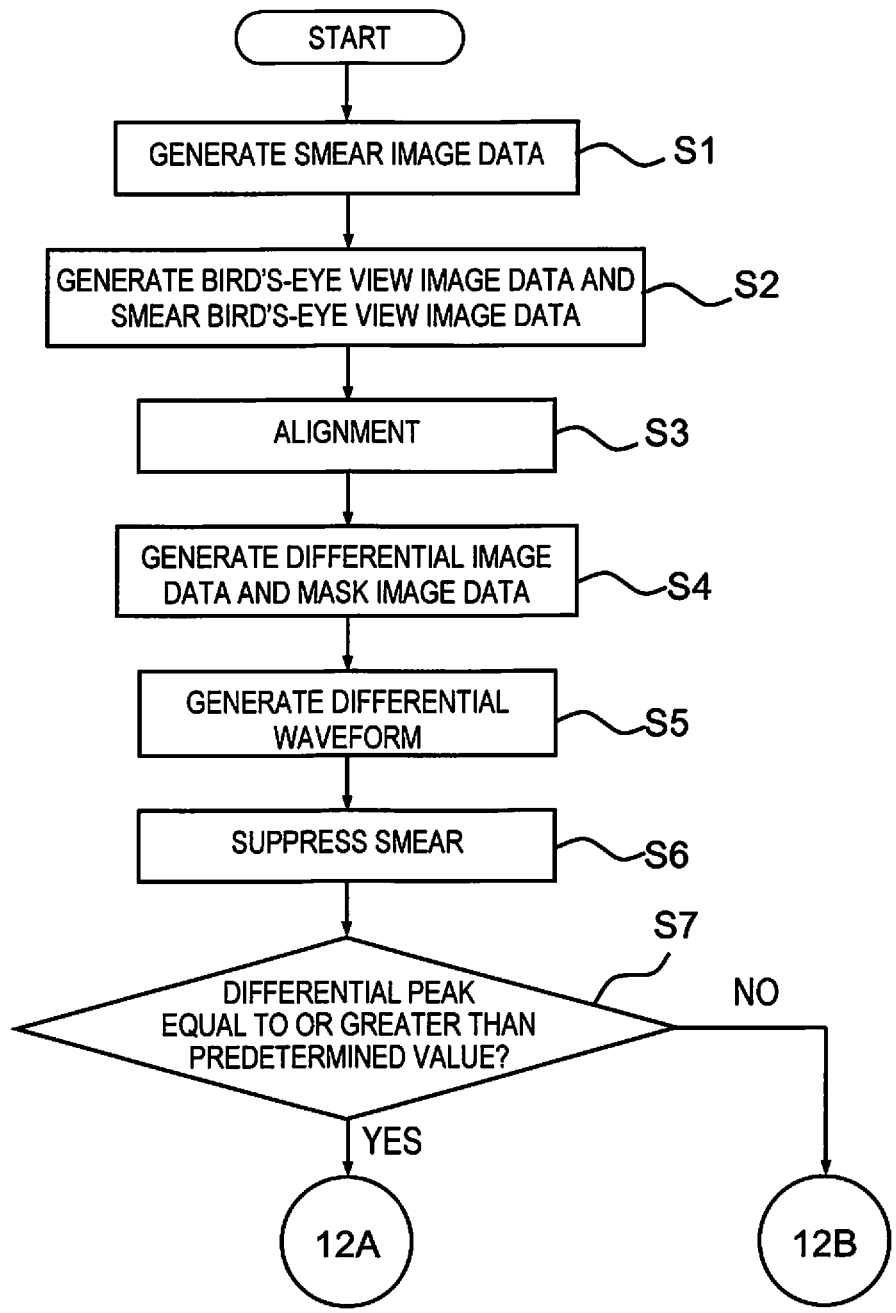
FIG. 11 is a first part of a flowchart illustrating the three-dimensional object detection method using differential waveform information carried out by the viewpoint conversion unit, alignment unit, smear detection unit, and three-dimensional object detection unit in FIG. 3.
Figure 12:
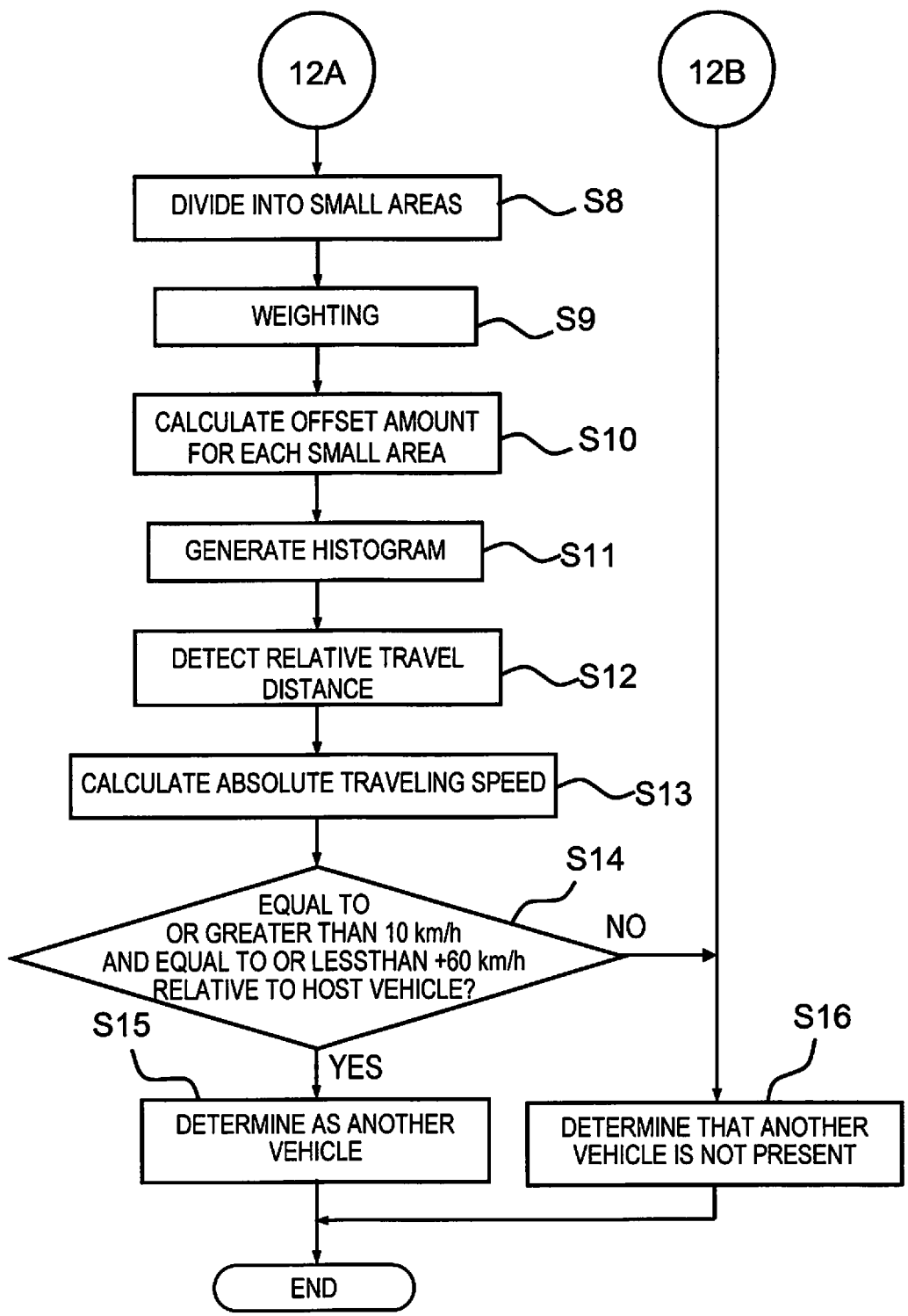
FIG. 12 is a second part of a flowchart illustrating the three-dimensional object detection method using differential waveform information carried out by the viewpoint conversion unit, alignment unit, smear detection unit, and three-dimensional object detection unit in FIG. 3.

The procedure for detecting a three-dimensional object using differential waveform information is next described. FIGS. 11 and 12 are flowcharts illustrating the three-dimensional object detection procedure of the present embodiment. As illustrated in FIG. 11, first, data of a captured image P acquired by the camera 10 is inputted to the computer 30, and a smear image SP is generated by the smear detection unit 40 (S1). Next, the viewpoint conversion unit 31 generates data of the bird's-eye view image $PB_t$ from the data of the captured image P from the camera 10, and generates data of the smear bird's-eye view image $SB_t$ from the data of the smear image SP (S2).

The alignment unit 32 aligns the bird's-eye view image $PB_t$ data with the bird's-eye view image $PB_{t-1}$ data of a single moment prior, and aligns the smear bird's-eye view image $SB_t$ data with the smear bird's-eye view image $SB_{t-1}$ data of a single moment prior (S3). After alignment, the alignment unit 32 generates differential image $PD_t$ data, and generates mask image MP data (S4). The three-dimensional object detection unit 33 then generates a differential waveform DWt from the differential image $PD_t$ data and the differential image data $PD_{t-1}$ of a single moment prior (S5). After generation of the differential waveform $DW_t$, the three-dimensional object detection unit 33 sets the count number corresponding to the area of occurrence of the smear S to zero in the differential waveform $DW_t$, and suppresses the influence of the smear S (S6).

The three-dimensional object detection unit 33 then assesses whether the peak in the differential waveform DWt is at a first threshold value α or greater (S7). This first threshold value α can be set in advance, and can be changed in accordance with a control command from the controller 39 illustrated in FIG. 3, but the details are to be described later. Here, when the peak of the differential waveform $DW_t$ is not at the first threshold value α or greater, that is, when there is essentially no difference, it is thought that a three-dimensional object is not present in the captured image P. Therefore, when it has been assessed that the peak of the differential waveform $DW_t$ is not at the first threshold value α or greater (S7: NO), the three-dimensional object detection unit 33 assesses that another vehicle is not present in as an obstacle is not present (FIG. 12: S16). The processing illustrated in FIGS. 11 and 12 ends.

On the other hand, when the peak in the differential waveform $DW_t$ is assessed to be at a threshold value α or greater (S7: YES), the three-dimensional object detection unit 33 assesses that a three-dimensional object is present, and divides the differential waveform $DW_t$ into a plurality of small areas $DW_{t1}$ to $DW_{tn}$ (S8). The three-dimensional object detection unit 33 next imparts weighting to each of the small areas $DW_{t1}$ to $DW_{tn}$ (S9). The three-dimensional object detection unit 33 then calculates the offset amount for each of the small areas $DW_{t1}$ to $DW_{tn}$ (S10), and generates a histogram with consideration given to the weightings (S11).

The three-dimensional object detection unit 33 calculates the relative travel distance, which is the travel distance of the three-dimensional object in relation to the host vehicle V, based on the histogram (S12). The three-dimensional object detection unit 33 then calculates the absolute traveling speed of the three-dimensional object from the relative travel distance (S13). At this time, the three-dimensional object detection unit 33 time-differentiates the relative travel distance to calculate the relative traveling speed, and adds the vehicle speed detected by the speed sensor 20 to calculate the absolute traveling speed.

The three-dimensional object detection unit 33 then assesses whether the absolute traveling speed of the three-dimensional object is 10 km/h or more and whether the relative traveling speed of the three-dimensional object in relation to the host vehicle V is +60 km/h or less (S14). When both conditions are satisfied (S14: YES), the three-dimensional object detection unit 33 assesses that the three-dimensional object is another vehicle VX (S15). The processing illustrated in FIGS. 11 and 12 ends. On the other hand, when either one of the conditions is not satisfied (S14: NO), the three-dimensional object detection unit 33 assesses that another vehicle is not present (S16). The processing illustrated in FIGS. 11 and 12 ends.

In the present embodiment, the detection areas A1 and A2 are the rearward side directions of the host vehicle V, and focus is placed on detecting another vehicle VX, traveling in an adjacent lane adjacent to the lane in which the host vehicle is traveling, to which attention is to be paid during traveling of the host vehicle V, and particularly on whether the host vehicle V may possibly make contact with another vehicle should a lane change be made. Therefore, the process of step S14 is implemented. In other words, assuming that the system in the present embodiment is actuated on an expressway, when the speed of a three-dimensional object is less than 10 km/h, it would rarely be a problem even if another vehicle VX were to be present because the other vehicle would be positioned far behind the host vehicle V when a lane change is made. Similarly, when the relative traveling speed of a three-dimensional object exceeds +60 km/h in relation to the host vehicle V (that is, when the three-dimensional object is moving at a speed 60 km/h greater than the speed of the host vehicle V), it would rarely be a problem because the other vehicle would be positioned ahead of the host vehicle V when a lane change is made. Therefore, step S14 can also be considered to make an assessment of another vehicle VX that would become a problem were it to change lanes.

In step S14, it is assessed whether the absolute traveling speed of the three-dimensional object 10 km/h or greater, and whether the relative traveling speed of the three-dimensional object in relation to the host vehicle V is +60 km/h or less, thereby obtaining the following effect. For example, a possible case is that the absolute traveling speed of a stationary object is detected to be several km/h depending on the attachment error of the camera 10. Accordingly, assessing whether the speed is 10 km/h or greater makes it possible to reduce the possibility that the stationary object will be assessed to be another vehicle VX. Also, it is possible that the relative speed of a three-dimensional object in relation to the host vehicle V will be detected to be in excess of +60 km/h due to noise. Accordingly, assessing whether the relative speed is +60 km/h or less makes it possible to reduce the possibility of erroneous detection due to noise.

Furthermore, it may be assessed that the absolute traveling speed is not negative or is not 0 km/h instead of the processing in step S14. In the present embodiment, because attention is paid to whether there is a possibility of contact when the host vehicle V changes lanes, a warning sound may be emitted to the driver of the host vehicle or a display equivalent to a warning may be displayed on a predetermined display device when another vehicle VX is detected in step S15.

Thus, according to the procedure for detecting a three-dimensional object using differential waveform information in the present example, a differential waveform $DW_t$ is generated by counting the number of pixels indicating a predetermined difference on the data of the differential image $PD_t$ along the direction in which the three-dimensional object collapses by viewpoint conversion and forming a frequency distribution. Here, the pixels indicating a predetermined difference in the differential image $PD_t$ data are pixels which have changed in the image at different points in time, in other words, locations that can be construed to be where a three-dimensional object was present. Therefore, in locations where a three-dimensional object was present, the number of pixels is counted along the direction in which the three-dimensional object collapses to form a frequency distribution and thereby generate a differential waveform $DW_t$. In particular, because the number of pixels is counted along the direction in which the three-dimensional object collapses, a differential waveform $DW_t$ is generated from information about the height direction in relation to the three-dimensional object. The travel distance of the three-dimensional object is calculated from the change in time of the differential waveform $DW_t$ which includes height direction information. Therefore, in contrast to the focus being solely on the movement of a single point, the detection location prior to change in time and the detection location after change in time are specified with height direction information included and accordingly readily end up being the same location; the travel distance is calculated from the change in time at the same location; and the precision of calculating the travel distance can be improved.

The count number of the frequency distribution is set to zero for a location that corresponds to an area of occurrence of a smear S in the differential waveform $DW_t$. The waveform portion produced by the smear S in the differential waveform $DW_t$ is thereby eliminated, and erroneous recognition of the smear S as a three-dimensional object can be prevented.

The travel distance of the three-dimensional object is calculated from the offset amount of the differential waveform $DW_t$ when the error in the differential waveform $DW_t$ generated at difference points in time is at a minimum. The movement difference therefore is calculated from the offset amount of one-dimensional information, that is, a waveform, and the cost of computation for calculating travel distance can be kept down.

The differential waveforms $DW_t$ generated at different points in time are divided into a plurality of small areas $DW_{t1}$ to $DW_{tn}$. Dividing into a plurality of small areas $DW_{t1}$ to $DW_{tn}$ in this manner results in a plurality of waveforms expressing respective locations of a three-dimensional object. The travel distance of the three-dimensional object is calculated by assessing the offset amount when the error in the respective waveforms is at a minimum for each of the small areas $DW_{t1}$ to $DW_{tn}$, counting the offset amounts assessed for each of the small areas $DW_{t1}$ to $DW_{tn}$, and forming a histogram. Therefore, the offset amount is calculated for each location in the three-dimensional object, the travel distance is assessed from a plurality of offset amounts, and the precision of calculating the travel distance can be improved.

Weighting is imparted to each of the plurality of small areas $DW_{t1}$ to $DW_{tn}$, and the offset amount assessed for each of the small areas $DW_{t1}$ to $DW_{tn}$ is counted in accordance with the weighting to form a histogram. Therefore, the travel distance to be assessed one level more adequately by increasing the weighting for characteristic areas and decreasing the weight for uncharacteristic areas. Accordingly, the precision of calculating the travel distance can be improved one level further.

For each small area $DW_{t1}$ to $DW_{tn}$ in the differential waveform $DW_t$, the weighting is increased as the difference between the maximum value and the minimum value of the count of the number of pixels indicating a predetermined difference is greater. Therefore, the weighting is increased as the area of characteristic undulation has a greater difference between the maximum value and minimum value, and the weighting is decreased for flat areas having little undulation. Here, because the offset amount is easier to calculate in terms of shape for an area having greater undulation than a flat area, the precision of calculating the travel distance to be improved one level further by increasing the weighting as the area has a greater difference between the maximum value and the minimum value.

The travel distance of the three-dimensional object is also calculated from the maximum value of the histogram obtained by counting the offset amounts assessed for each of the small areas $DW_{t1}$ to $DW_{tn}$. Therefore, the travel distance can be calculated with higher accuracy from the maximum value even when there is variability in the offset amount.

Because the offset amount for a stationary object is assessed and this offset amount is ignored, a situation in which in the precision of calculating the travel distance of the three-dimensional object decreases due to a stationary object can be prevented. Also, on having ignored the offset amount that corresponds to a stationary object, calculation of the travel distance of the three-dimensional object is stopped when there is a plurality of maximum values. Therefore, a situation in which an erroneous travel distance is calculated such as when there is a plurality of maximum values can be prevented.

In the above embodiment, the speed of the host vehicle V is assessed based on signals from the speed sensor 20, but no limitation is imposed thereby, and the speed can be estimated from images of a plurality of different points in time. In this case, the speed sensor becomes unnecessary, and the configuration can be simplified.

In the above embodiment, an image of a current moment captured and an image of a single moment prior are converted to bird's-eye views, a differential image $PD_t$ is generated upon having aligned the converted bird's-eye views, and the generated differential image $PD_t$ is assessed along the collapsing direction (the direction in which the three-dimensional object collapses when the captured image is converted to a bird's-eye view) to generate a differential waveform $DW_t$, but no limitation is imposed thereby. For example, the differential waveform $DW_t$ may be generated by converting only an image of a single moment prior to a bird's-eye view, converting to the equivalent of an image captured again after aligning the converted bird's-eye view, generating a differential image between this image and the image of the current moment, and assessing the generated differential image along a direction equivalent to the collapsing direction (that is, a direction having converted the collapsing direction into the direction on the captured image). In other words, it is not necessary that bird's-eye views be generated distinctly as long as an image of a current moment and an image of a single moment prior are aligned, a differential image $PD_t$ is generated from the difference between the two images aligned, and the differential image $PD_t$ is assessed along the direction in which the three-dimensional object collapses when being converted to a bird's-eye view.

<<Detection of Three-Dimensional Object by Edge Information>>

Figure 13:
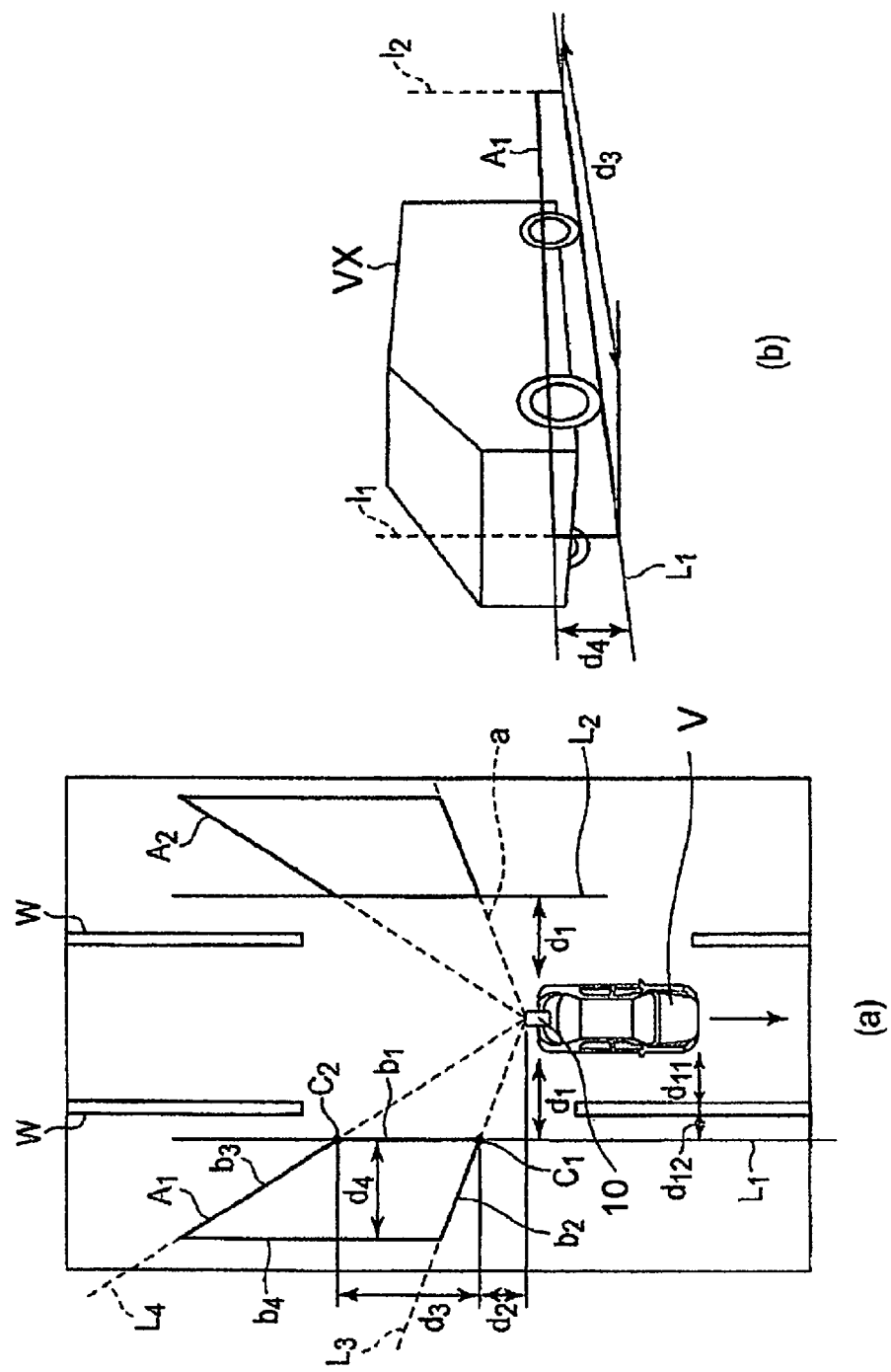
FIG. 13 is a view (three-dimensional object detection using edge information) illustrating a traveling state of the vehicle in FIG. 1, with part (a) of FIG. 13 being a plan view illustrating the positional relationships of the detection area, and the like, and part (b) of FIG. 13 being a perspective view illustrating the positional relationships of the detection area, and the like, in real space.

Next described is a three-dimensional object detection block B, which can be actuated instead of the three-dimensional object detection block A illustrated in FIG. 3. The three-dimensional object detection block B is configured with a luminance difference calculation unit 35, an edge line detection unit 36, and a three-dimensional object detection unit 37, and detects a three-dimensional object using edge information. FIG. 13 is a view illustrating the image range of the camera 10 in FIG. 3. Part (a) of FIG. 13 is a plan view, and part (b) of FIG. 13 is a perspective view in real space rearward from the host vehicle V. The camera 10 is set to a predetermined view angle a, and the rearward side of the host vehicle V included in the predetermined view angle a is captured, as illustrated in part (a) of FIG. 13. The view angle a of the camera 10 is set so that adjacent lanes are included in the capture range of the camera 10 in addition to the lane in which the host vehicle V is traveling, in the same manner as illustrated in FIG. 2.

The detection areas A1 and A2 in the present example are trapezoidal in a plan view (bird's-eye view state), and the position, size, and shape of the detection areas A1, A2 are decided based on distances $d_1$ to $d_4$. The detection areas A1 and A2 of the example illustrated in the drawing are not limited to being trapezoidal, and may also be rectangular or another shape in a bird's-eye view state, as illustrated in FIG. 2.

Here, the distance d1 is the distance from the host vehicle V to the ground lines L1 and L2. The ground lines L1 and L2 refer to a line in which a three-dimensional object, which is present in a lane adjacent to the lane in which the host vehicle V is traveling, is in contact with the ground. In the present embodiment, an object is to detect another vehicle VX or the like (including two-wheeled vehicles or the like) traveling in the left or right lane behind the host vehicle V and adjacent to the lane of the host vehicle V. Therefore, the distance d1, which is the position of the ground lines L1 and L2 of the other vehicle VX, can be decided so as to be substantially fixed from the distance d11 from the host vehicle V to a white line W and the distance d12 from the white line W to the position in which the other vehicle VX is predicted to travel.

The distance d1 is not limited to being fixedly decided, and may be variable. In this case, the computer 30 recognizes the position of the white line W in relation to the host vehicle V using white line recognition or another technique, and the distance d11 is decided based on the position of the recognized white line W. The distance d1 is thereby variably set using the decided distance d11. In the present embodiment described below, the position in which the other vehicle VX is traveling (the distance d12 from the white line W) and the position in which the host vehicle V is traveling (the distance d11 from the white line W) is mostly predictable, and the distance d1 is fixedly decided.

A distance d2 is the distance extending from the rear end part of the host vehicle V in the vehicle traveling direction. The distance d2 is decided so that the detection areas A1 and A2 are accommodated within at least the view angle a of the camera 10. In the present embodiment in particular, the distance d2 is set so as to be in contact with a range partitioned within the view angle a. The distance d3 indicates the length of the detection areas A1 and A2 in the vehicle progression direction. The distance d3 is decided based on the size of the three-dimensional object to be detected. In the present embodiment, the object to be detected is another vehicle VX or the like, and therefore the distance d3 is set to a length that includes the other vehicle VX.

The distance d4 indicates the height, which has been set so that the tires of the other vehicle VX, or the like, are included in real space, as illustrated in part (b) of FIG. 13. In a bird's-eye view image, the distance d4 is the length illustrated in part (a) of FIG. 13. The distance d4 may also be a length that does not include lanes further adjacent to the left and right adjacent lanes in the bird's-eye view image (that is, adjacent lanes two lanes away). This is because when the lanes two lanes away from the lane of the host vehicle V are included, it is no longer possible to distinguish whether another vehicle VX is present in the adjacent lanes to the left and right of the lane in which the host vehicle V is traveling, or whether another vehicle VX is present in an adjacent lane two lanes away.

As described above, the distances d1 to d4 are decided, and the position, size, and shape of the detection areas A1 and A2 are thereby decided. More specifically, the position of the top side b1 of the detection areas A1 and A2 that form a trapezoid is decided by the distance d1. The starting position C1 of the top side b1 is decided by the distance d2. The end position C2 of the top side b1 is decided by the distance d3. The lateral side b2 of the detection areas A1 and A2 that form a trapezoid is decided by a straight line L3 extending from the camera 10 toward the starting position C1. Similarly, the lateral side b3 of the detection areas A1 and A2 that form a trapezoid is decided by a straight line L4 extending from the camera 10 toward the end position C2. The position of the lower side b4 of the detection areas A1 and A2 that form a trapezoid is decided by the distance d4. In this manner, the areas surrounded by the sides b1 to b4 are the detection areas A1 and A2. The detection areas A1 and A2 are regular squares (rectangles) in real space rearward from the host vehicle V, as illustrated in part (b) of FIG. 13.

Returning to FIG. 3, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, for example, vertically downward (or slightly inclined downward). Viewpoint conversion can be carried out using the technique described in, for example, Japanese Laid-Open Patent Application No. 2008-219063.

The luminance difference calculation unit 35 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a perpendicular imaginary line extending along the perpendicular direction in real space, the luminance difference between two pixels near each position. The luminance difference calculation unit 35 is capable of calculating the luminance difference by a method for setting a single perpendicular imaginary line extending in the perpendicular direction in real space, or a method for setting two perpendicular imaginary lines.

The specific method for setting two perpendicular imaginary lines is described. The luminance difference calculation unit 35 sets a first perpendicular imaginary line that corresponds to a line segment extending in the perpendicular direction in real space, and a second perpendicular imaginary line that is different from the first perpendicular imaginary line and that corresponds to a line segment extending in the perpendicular direction in real space. The luminance difference calculation unit 35 assesses the luminance difference between a point on the first perpendicular imaginary line and a point on the second perpendicular imaginary line in continuous fashion along the first perpendicular imaginary line and the second perpendicular imaginary line. The operation of the luminance difference calculation unit 35 is described in detail below.

Figure 14:
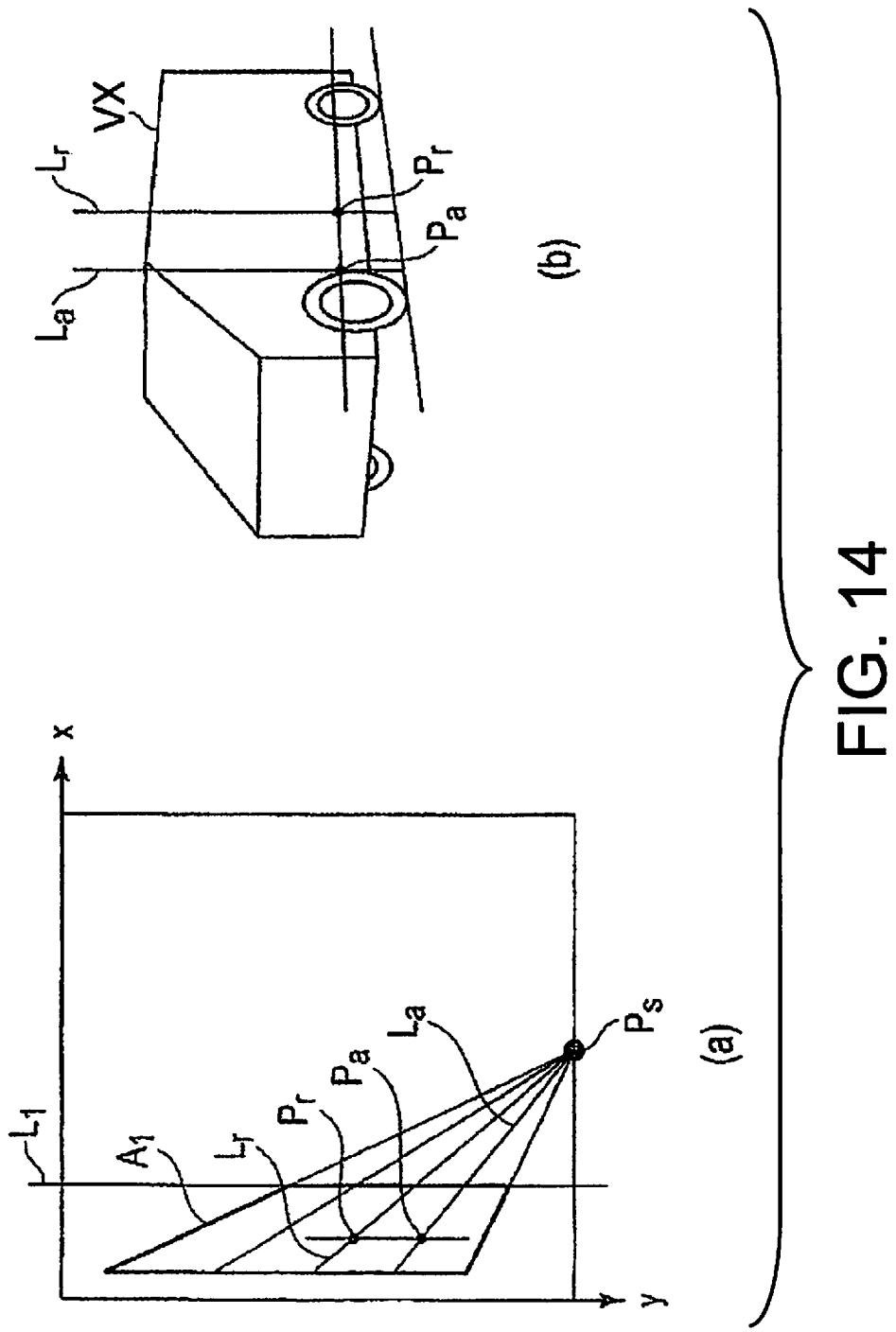
FIG. 14 is a view for describing the operation of the luminance difference calculation unit in FIG. 3, with part (a) of FIG. 14 being a view illustrating the positional relationships among attention lines, reference lines, attention points, and reference points in a bird's-eye view image, and part (b) of FIG. 14 being view illustrating the positional relationships among attention lines, reference lines, attention points, and reference points in real space.

The luminance difference calculation unit 35 sets a first perpendicular imaginary line La (hereinbelow referred to as "attention line La") that corresponds to a line segment extending in the perpendicular direction in real space and that passes through the detection area A1, as illustrated in part (a) of FIG. 14. The luminance difference calculation unit 35 sets a second perpendicular imaginary line Lr (hereinbelow referred to as "reference line Lr") that is different from the attention line La, corresponds to a line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the direction in which the three-dimensional object collapses when being converted to a bird's-eye view.

The luminance difference calculation unit 35 sets an attention point Pa on the attention line La (a point on the first perpendicular imaginary line). The luminance difference calculation unit 35 sets a reference point Pr on the reference line Lr (a point on the second perpendicular imaginary line). The attention line La, the attention point Pa, the reference line Lr, and the reference point Pr have the relationship in real space illustrated in part (b) of FIG. 14. It is apparent from part (b) of FIG. 14 that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 35 assesses the luminance difference between the attention point Pa and the reference point Pr. If the luminance difference between the attention point Pa and the reference point Pr is great, it is possible that an edge is present between the attention point Pa and the reference point Pr. Therefore, the edge line detection unit 36 illustrated in FIG. 3 detects an edge line based on the luminance difference between the attention point Pa and the reference point Pr.

Figure 15:
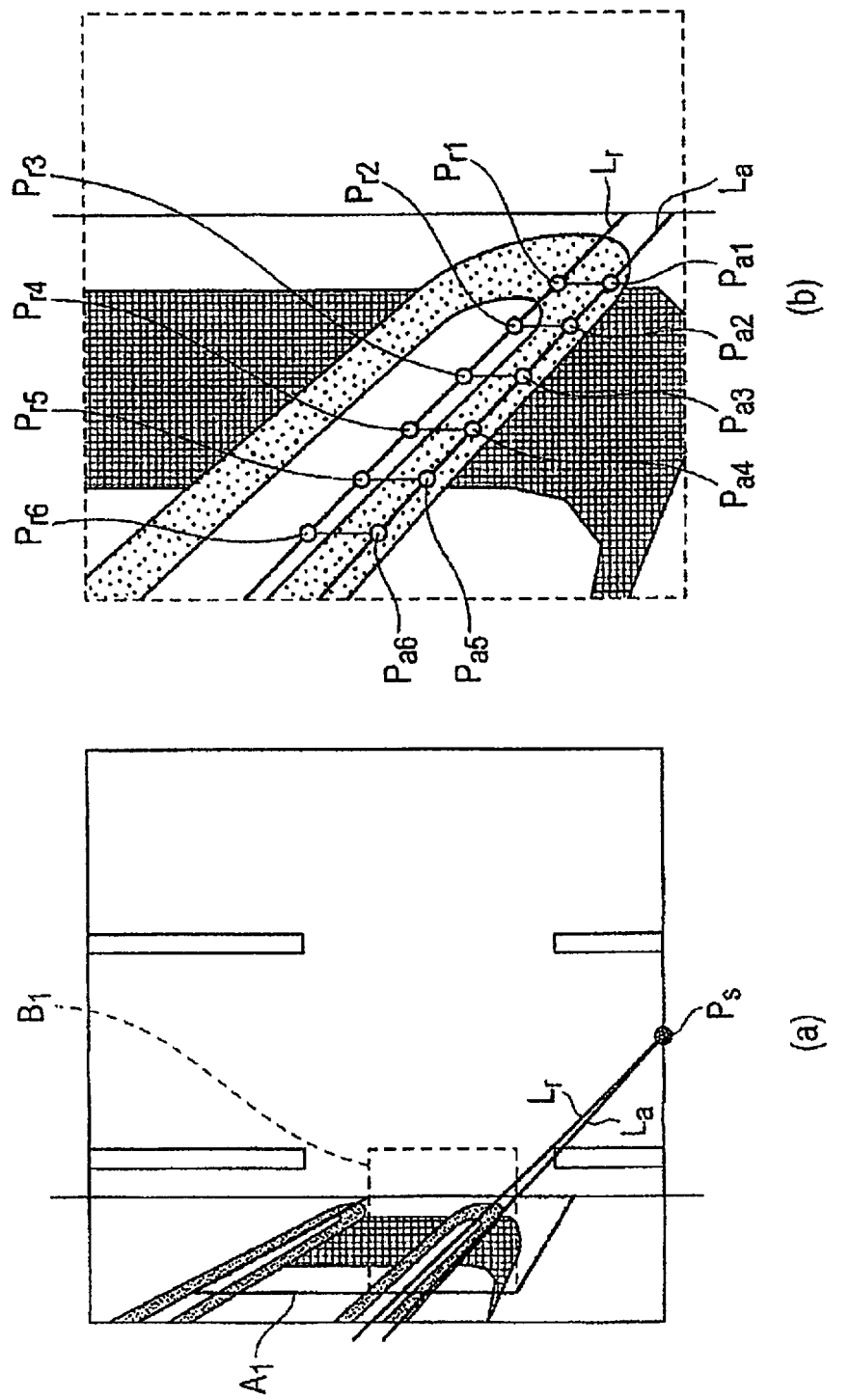
FIG. 15 is a view for describing the detailed operation of the luminance difference calculation unit in FIG. 3, with part (a) of FIG. 15 being a view illustrating a detection area in a bird's-eye view image, and part (b) of FIG. 15 being view illustrating the positional relationships among attention lines, reference lines, attention points, and reference points in a bird's-eye view image.

This point will be described in greater detail. FIG. 15 is a view illustrating the detailed operation of the luminance difference calculation unit 35. Part (a) of FIG. 15 illustrates a bird's-eye view image of the bird's-eye view state. Part (b) of FIG. 15 is an enlarged view of a portion B1 of the bird's-eye view image illustrated in part (a) of FIG. 15. In FIG. 15, only the detection area A1 is illustrated and described, but the luminance difference is calculated using the same procedure for detection area A2.

When the other vehicle VX is being displayed in the obtained image captured by the camera 10, the other vehicle VX appears in the detection area A1 in the bird's-eye view image, as illustrated in part (a) of FIG. 15. The attention line La is set on a rubber portion of a tire of the other vehicle VX in the bird's-eye view image in part (b) of FIG. 15, as illustrated in the enlarged view of area B1 in part (a) of FIG. 15. In this state, first, the luminance difference calculation unit 35 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the other vehicle VX set, for example, at a distance that corresponds to 10 cm from the rubber of the tire of the other vehicle VX in the bird's-eye view image.

Next, the luminance difference calculation unit 35 sets a plurality of attention points Pa1 to PaN on the attention line La. In part (b) of FIG. 15, six attention points Pa1 to Pa6 (hereinbelow referred to as "attention point Pai" when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points Pa1 to PaN in real space. The luminance difference calculation unit 35 calculates the luminance difference between attention point Pa and reference point Pr pairs at the same height. The luminance difference calculation unit 35 thereby calculates the luminance difference between two pixels for each of the plurality of positions (1 to N) along the perpendicular imaginary line extending in the perpendicular direction in real space. The luminance difference calculation unit 35 calculates the luminance difference between, for example, a first attention point Pa1 and a first reference point Pr1, and calculates the luminance difference between a second attention point Pa2 and a second reference point Pr2. The luminance difference calculation unit 35 thereby assesses the luminance difference in continuous fashion along the attention line La and the reference line Lr. In other words, the luminance difference calculation unit 35 sequentially assesses the luminance difference between the third to Nth attention points Pa3 to PaN and the third to Nth reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space along the direction in which the ground line L1 extends. The luminance difference calculation unit 35, for example, sets the line that was the reference line Lr in the previous process to be the attention line La, sets the reference line Lr in relation to the attention line La, and sequentially assesses the luminance difference.

Returning to FIG. 3, the edge line detection unit 36 detects the edge line from the continuous luminance difference calculated by the luminance difference calculation unit 35. For example, in the case illustrated in part (b) of FIG. 15, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Accordingly, the luminance difference between the second to sixth attention points Pa2 to Pa6 and the second to sixth reference points Pr2 to Pr6 is great. Therefore, the edge line detection unit 36 is capable of detecting that an edge line is present between the second to sixth attention points Pa2 to Pa6 and the second to sixth reference points Pr2 to Pr6 where the luminance difference is high.

Specifically, when an edge line is to be detected, the edge line detection unit 36 first assigns an attribute to the ith attention point Pai from the luminance difference between the ith attention point Pai (coordinates (xi, yi)) to the ith reference point Pri (coordinates (xi', yi')) in accordance with formula 1 noted below.

When $I(xi,yi)>I(xi',yi')+t$ $s(xi,yi)=1$ when $I(xi,yi)<I(xi',yi')-t$ $s(xi,yi)=-1$ otherwise $s(xi,yi)=0$ [Formula 1]

In formula 1 above, t represents a threshold value, I(xi, yi) represents the luminance value of the ith attention point Pai, and I(xi', yi') represents the luminance value of the ith reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above. This first threshold value can be set in advance, and can be changed in accordance with a control command issued by the controller 39 illustrated in FIG. 3, but the details are to be described later.

Next, the edge line detection unit 36 assesses whether the attention line La is an edge line from the continuity c(xi, yi) of the attribute s along the attention line La based on the following formula 2.

When $s(xi,yi)=s(xi+1,yi+1)$ (excluding when 0=0)

$c(xi,yi)=1$ otherwise $c(xi,yi)=0$ [Formula 2]

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 assesses the sum of the continuities c of all the attention points Pa on the attention line La. The edge line detection unit 36 divides the sum of the continuities c thus assessed by the number N of attention points Pa to thereby normalize the continuity c. The edge line detection unit 36 assesses the attention line La to be an edge line when the normalized value has exceeded a threshold value θ. The threshold value θ is set in advance by experimentation or other means. The threshold value θ can be set in advance.

In other words, the edge line detection unit 36 assesses whether the attention line La is an edge line based on formula 3 noted below. The edge line detection unit 36 then assesses whether all of the attention lines La drawn on the detection area A1 are edge lines.

$\Sigma c(xi,yi)/N>\theta$ [Formula 3]

Returning to FIG. 3, the three-dimensional object detection unit 37 detects a three-dimensional object based on the quantity of edge lines detected by the edge line detection unit 36. As described above, the three-dimensional object detection device 1 according to the present embodiment detects an edge line extending in the perpendicular direction in real space. Detecting many edge lines extending in the perpendicular direction indicates that there is a high possibility that a three-dimensional object is present in the detection areas A1 and A2. Therefore, the three-dimensional object detection unit 37 detects a three-dimensional object based on the quantity of edge lines detected by the edge line detection unit 36. Furthermore, prior to detecting the three-dimensional object, the three-dimensional object detection unit 37 assesses whether the edge lines detected by the edge line detection unit 36 are correct. The three-dimensional object detection unit 37 assesses whether a change in luminance on the edge lines is greater than a predetermined threshold value along the edge lines of the bird's-eye view image. When the change in luminance on the edge lines in the bird's-eye view image is greater than a predetermined threshold value, the edge lines are assessed to have been detected by erroneous assessment. On the other hand, when the change in luminance on the edge lines in the bird's-eye view image is not greater than a predetermined threshold value, it is assessed that the edge lines are correct. The threshold value is set in advance by experimentation or other means.

Figure 16:
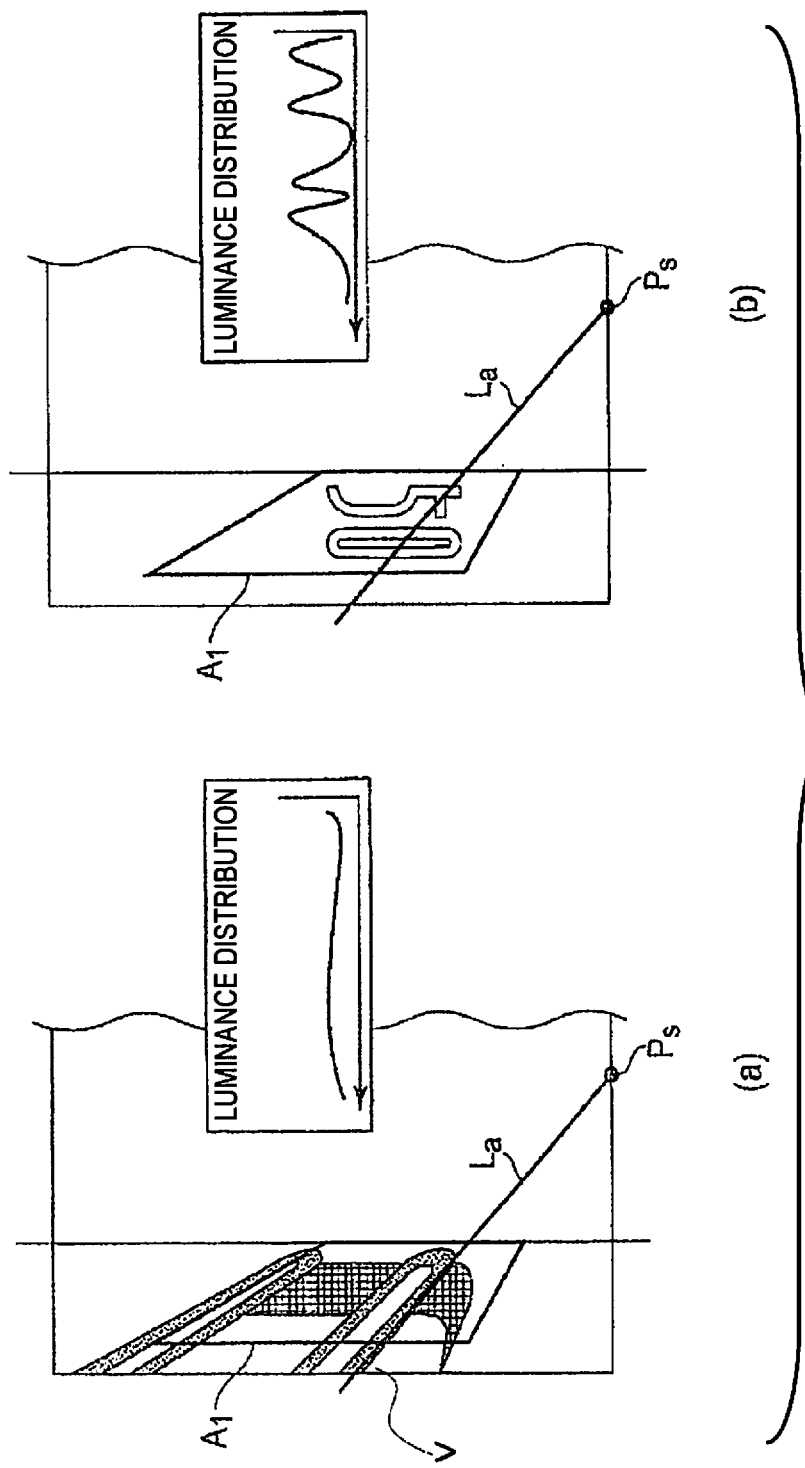
FIG. 16 is a view illustrating an edge line and a luminance distribution on the edge line, with part (a) of FIG. 16 being a view illustrating the luminance distribution when a three-dimensional object (vehicle) is present in the detection area, and part (b) of FIG. 16 being a view illustrating the luminance distribution when a three-dimensional object is not present in the detection area.

FIG. 16 is a view illustrating the luminance distribution on the edge line, with part (a) of FIG. 16 illustrating the edge line and the luminance distribution when another vehicle VX as a three-dimensional object is present in the detection area A1, and with part (b) of FIG. 16 illustrating the edge line and the luminance distribution when a three-dimensional object is not present in the detection area A1.

As illustrated in part (a) of FIG. 16, it is assumed that it has been assessed that the attention line La set on the tire rubber portion of the other vehicle VX in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the other vehicle VX is enlarged within the bird's-eye view image. On the other hand, the attention line La set in the white character portion "50" drawn on the road surface in the bird's-eye view image is assumed to have been erroneously assessed to be an edge line, as illustrated in part (b) of FIG. 16. In this case, the change in luminance on the attention line La in the bird's-eye view image has considerable undulations. This is because the road surface and other portions of low luminance are mixed with the portions of high luminance in the white characters on the edge line.

The three-dimensional object assessment unit 37 assesses whether an edge line has been detected by erroneous assessment based on differences in the luminance distribution on the attention line La as described above. The three-dimensional object detection unit 37 assesses that the edge line has been detected by erroneous assessment when the change in luminance along the edge line is greater than a predetermined threshold value. The edge line is not used for detection of a three-dimensional object. A reduction in precision of detecting a three-dimensional object is thereby suppressed when white characters such as "50" on the road surface, roadside vegetation, and the like, are assessed to be edge lines.

Specifically, the three-dimensional object detection unit 37 calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the ith luminance value I(xi, yi) and the adjacent ith+1 luminance value I(xi+1, yi+1) on the attention line La. Formula 5 evaluates the luminance distribution using the total value of the absolute value of the difference between the ith luminance value I(xi, yi) and the adjacent ith+1 luminance value I(xi+1, yi+1) on the attention line La.

Evaluation value in perpendicular equivalent direction=$\Sigma[\{I(xi,yi)-I(xi+1,yi+1)\}^2]$    Formula 4

Evaluation value in perpendicular equivalent direction=$\Sigma|I(xi,yi)-I(xi+1,yi+1)|$    Formula 5

No limitation is imposed in the use of formula 5, and it is also possible to binarize an attribute b of an adjacent luminance value using a threshold value t2, and then sum the binarized attribute b for all of the attention points Pa, as in formula 6 noted below.

Evaluation value in perpendicular equivalent direction=$\Sigma b(xi,yi)$ where, when $|I(xi,yi)-I(xi+1,yi+1)|>t2$ $b(xi,yi)=1$ otherwise $b(xi,yi)=0$    Formula 6

The attribute b(xi, yi) of the attention point Pa(xi, yi) is '1' when the absolute value of the luminance difference between the luminance value of the attention point Pai and the luminance value of the reference point Pri is greater than a threshold value t2. When the relationship is otherwise, the attribute b(xi, yi) of the attention point Pai is '0.' The threshold value t2 is set in advance by experimentation or other means so that the attention line La is not assessed to be on the same three-dimensional object. The three-dimensional object detection unit 37 then sums the attribute b for all of the attention points Pa on the attention line La and assesses the evaluation value in the perpendicular equivalent direction to thereby assess whether an edge line is correct.

Figure 17:
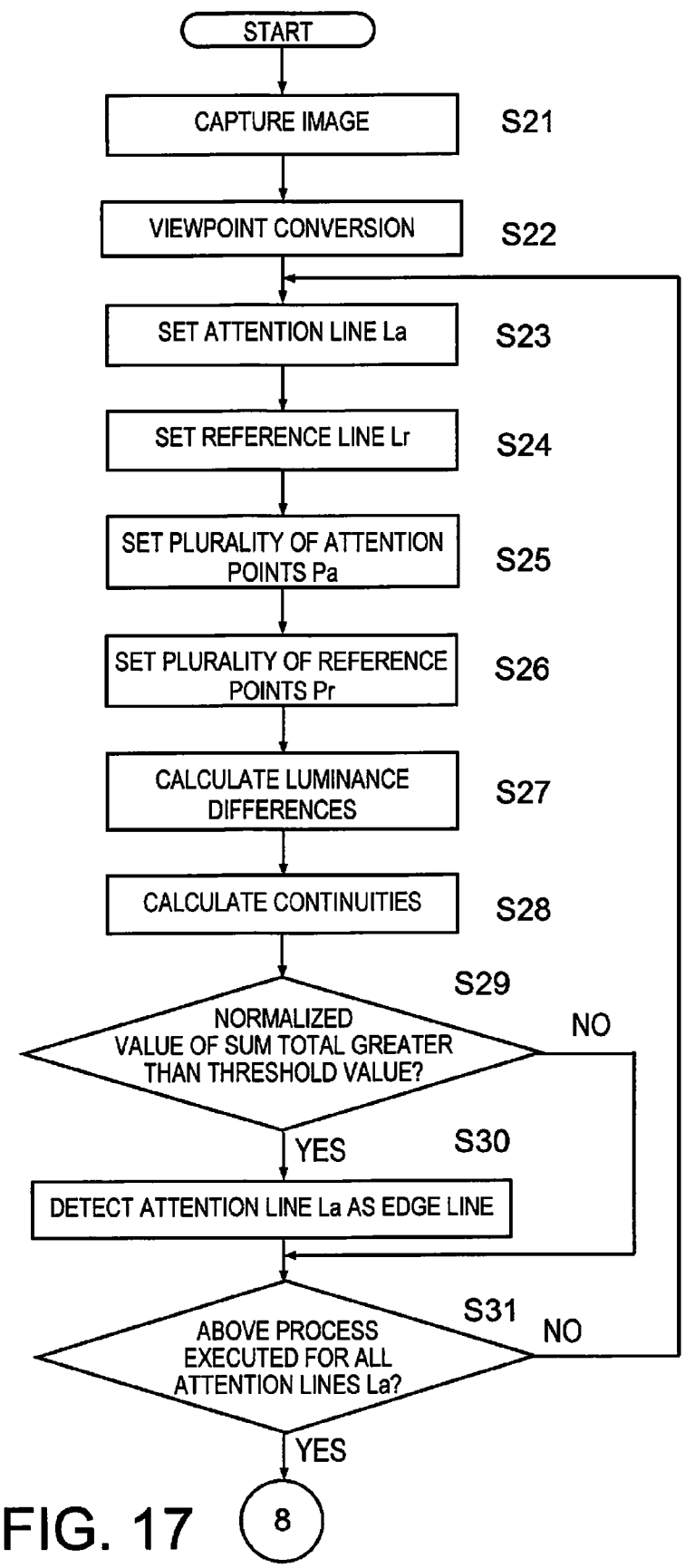
FIG. 17 is a first part of flowchart illustrating the three-dimensional object detection method using edge information carried out by the viewpoint conversion unit, luminance difference calculation unit, edge line detection unit, and three-dimensional object detection unit in FIG. 3.
Figure 18:
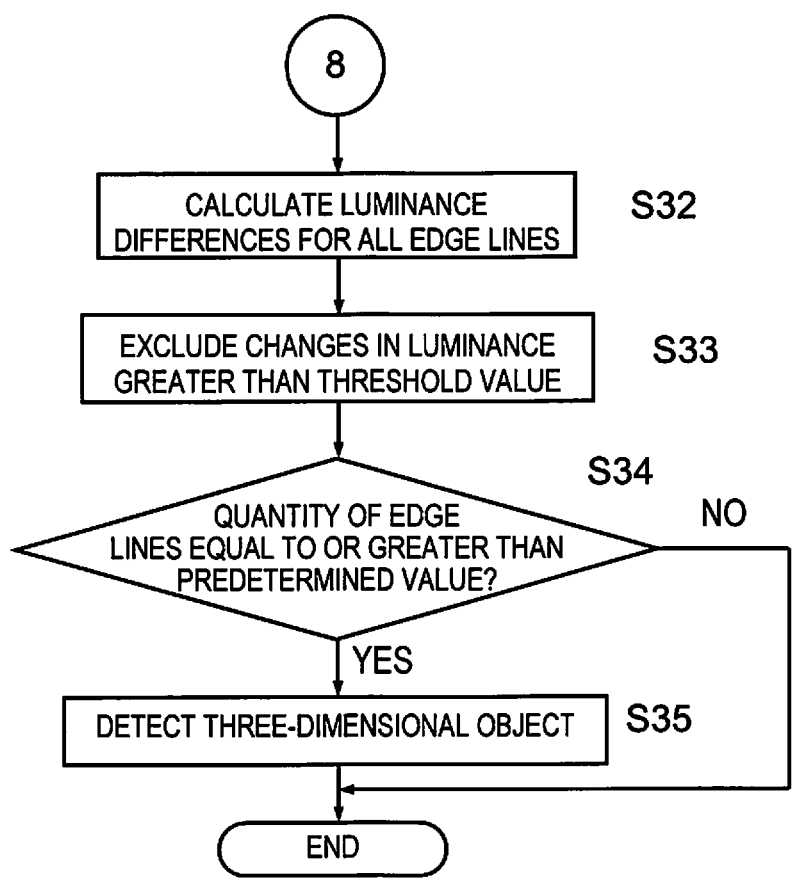
FIG. 18 is a second part of a flowchart illustrating the three-dimensional object detection method using edge information carried out by the viewpoint conversion unit, luminance difference calculation unit, edge line detection unit, and three-dimensional object detection unit in FIG. 3.

Next, the method for detecting a three-dimensional object utilizing edge information according to the present embodiment will be described. FIGS. 17 and 18 are flowcharts illustrating the details of the method for detecting a three-dimensional object according to the present embodiment. In FIGS. 17 and 18, the process involved with detection area A1 will be described for the sake of convenience, but the same process is executed for the detection area A2 as well.

First, in step S21, the camera 10 captures a predetermined area specified by the view angle a and the attachment position, as illustrated in FIG. 17. Next, in step S22, the viewpoint conversion unit 31 accepts input of the obtained image captured by the camera 10 in step S21, and converts the viewpoint to generate bird's-eye view image data.

Next, in step S23, the luminance difference calculation unit 35 sets the attention line La on the detection area A1. At this time, the luminance difference calculation unit 35 sets a line corresponding to a line extending in the perpendicular direction in real space as the attention line La. Also, in step S24, the luminance difference calculation unit 35 also sets the reference line Lr on the detection area A1. At this time, the luminance difference calculation unit 35 sets, as the reference line Lr, a line that corresponds to a line segment extending in the perpendicular direction in real space and is separated by a predetermined distance in real space from the attention line La.

Next, in step S25, the luminance difference calculation unit 35 sets a plurality of attention points on the attention line La. At this time, the luminance difference calculation unit 35 sets a certain number of attention points Pa that will not be problematic during edge detection by the edge line detection unit 36. In step S26, the luminance difference calculation unit 35 sets reference points Pr so that the attention points Pa and the reference points Pr are at substantially the same height in real space. The attention points Pa and the reference points Pr thereby line up in substantially the horizontal direction, and the edge line extending in the perpendicular direction in real space is more readily detected.

Next, in step S27, the luminance difference calculation unit 35 calculates the luminance difference between the attention points Pa and the reference points Pr at the same height in real space. Next, the edge line detection unit 36 calculates the attribute s of the attention points Pa in accordance with formula 1 described above. Next, in step S28, the edge line detection unit 36 calculates the continuity c of the attribute s of the attention points Pa in accordance with formula 2. Next, in step S29, the edge line detection unit 36 assesses whether a value obtained by normalizing the sum of the continuities c is greater than a threshold value θ in accordance with formula 3. When it has been assessed that the normalized value is greater than the threshold value θ (S29: YES), the edge line detection unit 36 detects the attention line La as the edge line in step S30. The process then proceeds to step S31. When it has been assessed that the normalized value is not greater than the threshold value θ (S29: NO), the edge line detection unit 36 does not detect that the attention line La is an edge line, and the process proceeds to step S31. This threshold value θ can be set in advance, but can be changed in accordance with a control command by the controller 39.

In step S31, the computer 30 assesses whether the processes of the above steps S23 to S30 have been executed for all the attention lines La that can be set on the detection area A1. When it has been assessed that the above processes have not been carried out for all the attention lines La (S31: NO), the process returns to step S23, sets a new attention line La, and repeats the process through step S31. On the other hand, when it has been assessed that the processes have been carried out for all the attention lines La (S31: YES), the process proceeds to step S32 in FIG. 18.

In step S32 in FIG. 18, the three-dimensional object detection unit 37 calculates the change in luminance along the edge line for each edge line detected in step S30 in FIG. 17. The three-dimensional object detection unit 37 calculates the change in luminance of edge lines in accordance with any of formulas 4, 5, and 6. Next, in step S33, the three-dimensional object detection unit 37 excludes, from among the edge lines, edge lines in which the change in luminance is greater than a predetermined threshold value. In other words, when an edge line having a large change in luminance is not assessed to be a correct edge line, the edge line is not used for detecting a three-dimensional object. This is done in order to suppress the detection of characters on the road surface, roadside vegetation, and the like, included in the detection area A1 as edge lines, as described above. Accordingly, the predetermined threshold value is a value that is assessed by experimentation or other means in advance and is set based on the change in luminance that occurs due to characters on the road surface, roadside vegetation, and the like.

Next, in step S34, the three-dimensional object detection unit 37 assesses whether the quantity of edge lines is at a second threshold value β or higher. This second threshold value β can be set as assessed by experimentation or other means in advance, and can be changed in accordance with a control command issued by the controller 39 illustrated in FIG. 3, but the details are to be described later. For example, when a four-wheeled vehicle is set as the three-dimensional object to be detected, the second threshold value β is set in advance by experimentation or other means based on the number of edge lines of a four-wheeled vehicle that appears in the detection area A1. When it has been assessed that the quantity of edge lines is at a second threshold value β or greater (S34: YES), the three-dimensional object detection unit 37 assesses in step S35 that a three-dimensional object is present in the detection area A1. On the other hand, when is has been assessed that the quantity of edge lines is not at a threshold value β or higher (S34: NO), the three-dimensional object detection unit 37 assesses that a three-dimensional object is not present in the detection area A1. The processing illustrated in FIGS. 17 and 18 then ends. The detected three-dimensional object may be assessed to be another vehicle VX traveling in an adjacent lane adjacent to the lane in which the host vehicle V is traveling, or may be assessed to be another vehicle VX traveling in an adjacent lane with consideration given to the relative speed of the detected three-dimensional object in relation to the host vehicle V. This second threshold value β can be set in advance, but can be changed in accordance with a control command by the controller 39.

As described above, according to the method for detecting a three-dimensional object utilizing edge information of the present invention, a perpendicular imaginary line as a line segment extending in the perpendicular direction in real space in relation to the bird's-eye view image is set in order to detect a three-dimensional object present in the detection areas A1 and A2. The luminance difference between two pixels near each position is calculated for each of a plurality of positions along the perpendicular imaginary line, and the presence or absence of a three-dimensional object can be assessed based on continuity of the luminance difference.

Specifically, an attention line that corresponds to a line segment extending in the perpendicular direction in real space and a reference line Lr that is different from the attention line La are set in relation to the detection areas A1 and A2 in the bird's-eye view image. The luminance difference between an attention point Pa on the attention line La and a reference point Pr on the reference line Lr is assessed in a continuous fashion along the attention line La and the reference line Lr. The luminance difference between the attention line and the reference line Lr is obtained by assessing the luminance difference between points in a continuous fashion. There is a high possibility that there is an edge of a three-dimensional object in the location where the attention line La has been set when the luminance difference between the attention line La and the reference line Lr is high. The three-dimensional object can be detected based on continuous luminance difference thereby. In particular, the process for detecting a three-dimensional object is not affected even when the three-dimensional object is enlarged in accordance with the height from the road surface by conversion to a bird's-eye view image in order compare the luminance between the perpendicular imaginary lines extending in the perpendicular direction in real space. Accordingly, the precision of detecting a three-dimensional object can be improved according to the method of the present example.

In the present example, the luminance difference between two points at substantially the same height near the perpendicular imaginary line is assessed. Specifically, the luminance difference is assessed from an attention point Pa on the attention line La and a reference point Pr on the reference line Lr being substantially at the same height. Therefore, the luminance difference when an edge extending in the perpendicular direction is present can be distinctly detected.

Figure 19:
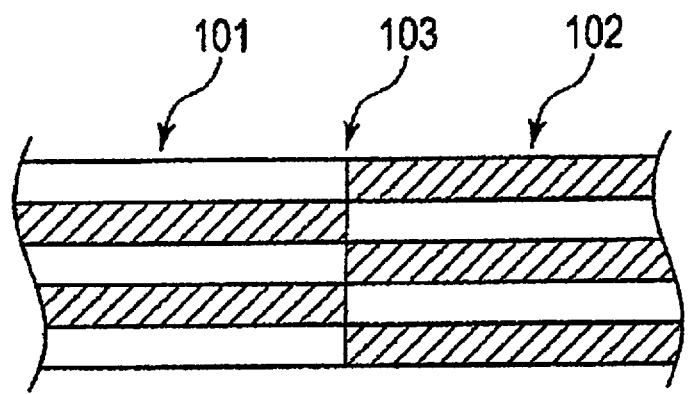
FIG. 19 is a view illustrating an example of an image for describing the edge detection operation.

In the present example, an attribute is assigned to the attention point Pa based on the luminance difference between the attention point Pa on the attention line La and the reference point Pr on the reference line Lr, and it is assessed whether the attention line La is an edge line based on the continuity c of the attributes along the attention line. Therefore, the boundaries between areas having high luminance and areas having low luminance are detected as edge lines, and edges can be detected in accordance with the natural senses of a human. The results of the above will be described. FIG. 19 is a view illustrating an image example for describing the processing of the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 36 assesses the location 103 to be an edge line only when there is continuity of the attributes of the luminance difference, in addition to the luminance difference in the area 103. Therefore, the edge line detection unit 36 is capable of suppressing erroneous assessment in which the location 103, which is not recognized as an edge line by human senses, is recognized as an edge line, and edges can be detected in a manner consistent with human senses.

In the present example, it is assessed whether an edge line has been detected by erroneous assessment when the change in luminance of the edge line detected by the edge line detection unit 36 is greater than a predetermined threshold value. A three-dimensional object included in a captured image tends to appear in an enlarged state in a bird's-eye view image when the captured image acquired by the camera 10 is converted to a bird's-eye view image. For example, as described above, when the tire of another vehicle VX is enlarged, changes in the luminance of the bird's-eye view image in the enlarged direction tend to be small because the tire as a single location is enlarged. In contrast, when a character, or the like, drawn on the road surface has been erroneously assessed to be an edge line, areas such as the character portion having high luminance and areas such as the road surface portion having low luminance are included in the bird's-eye view image in an intermixed fashion. In this case, changes in luminance in the enlarged direction tend to be greater in the bird's-eye view image. Accordingly, an edge line detected by erroneous assessment can be recognized by assessing the change in luminance in the bird's-eye view image along the edge line, and the precision of detection of a three-dimensional object can be increased.

Final Assessment of Three-Dimensional Object

Returning to FIG. 3, the three-dimensional object detection device 1 of the present example is provided with two three-dimensional object detection units 33 (or three-dimensional object detection unit 37), a three-dimensional object assessment unit 34, a high-luminance area assessment unit 38, and a controller 39, as described above. The three-dimensional object assessment unit 34 assesses whether a detected three-dimensional object is, after all, another vehicle VX in the detection area A1 or A2 based on the result of detection by the three-dimensional object detection unit 33 (or three-dimensional object detection unit 37). The high-luminance area assessment unit 38 assesses either one of the detection areas A1 and A2 that contains a high-luminance area. The controller 39 suppresses assessment that a three-dimensional object detected from image information of the detection area A1 or A2 is another vehicle VX when it is assessed that a high-luminance area is included in either one of the detection areas A1 and A2.

Specifically, the controller 39 outputs a control command to control each unit (including the controller 39) constituting the computer 30 to suppress assessment that the detected three-dimensional object is another vehicle V present in the detection area A1 or A2. For example, the controller 39 generates a control command to adjust a threshold value or an output value used for detection or assessment in order to suppress issuance of a result of detection by the three-dimensional object detection unit 33 (or the three-dimensional object detection unit 37) that a three-dimensional object is present, or a result of assessment by the three-dimensional object assessment unit 34 that the three-dimensional object, is after all, another vehicle VX, and sends the control command to the three-dimensional object detection unit 33 (or the three-dimensional object detection unit 37) or the three-dimensional object assessment unit 34.

The controller 39 also generates a control command to stop processing to detect a three-dimensional object or assessment that the three-dimensional object is another vehicle VX, and a control command to output a result that a three-dimensional object is not detected or that the three-dimensional object is not another vehicle VX, and sends the control command to the three-dimensional object detection unit 33 (or the three-dimensional object detection unit 37) or the three-dimensional object assessment unit 34.

The three-dimensional object detection unit 33 of the present embodiment adjusts the threshold value or output value in accordance with the control command from the controller 39, detects a three-dimensional object under a strict standard, and outputs a detection result that a three-dimensional object is not detected, or stops the processing itself to detect a three-dimensional object. Likewise, the three-dimensional object assessment unit 38 adjusts the threshold value or output value in accordance with the control command from the controller 39, assesses whether a three-dimensional object detected under a strict standard is another vehicle VX, and outputs an assessment that a three-dimensional object is another vehicle VX, or stops the processing itself to determine a three-dimensional object. The above control processing is carried out when a first detection area A1 or A2 that includes a high-luminance area complying with a predetermined reference, being either one of the right-side and left-side detection areas A1 and A2, is detected by the high-luminance area assessment unit 38.

Figure 20A:
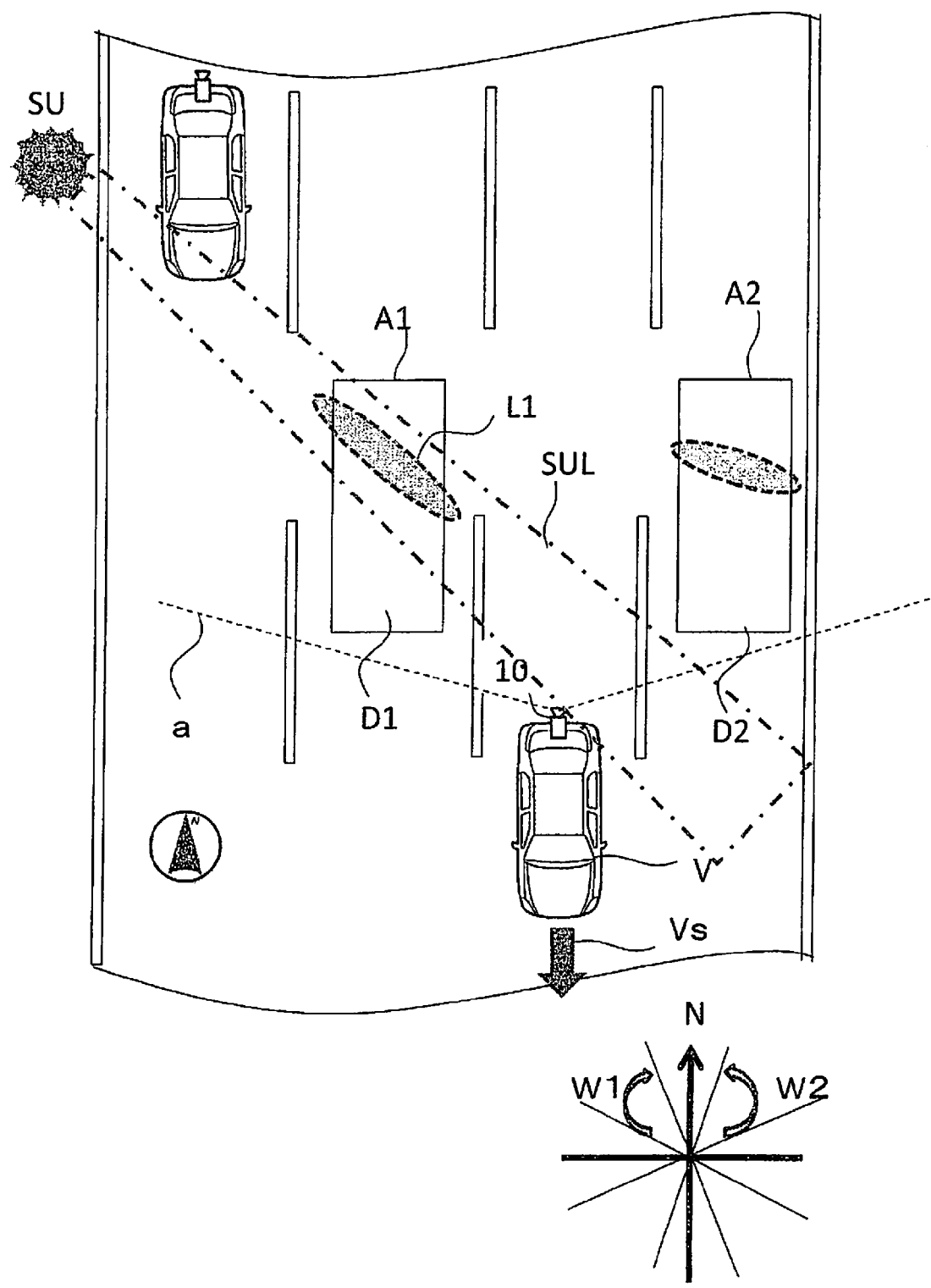
FIG. 20A is a view for describing a high-luminance area formed when sunlight comes into the detection area.
Figure 20B:
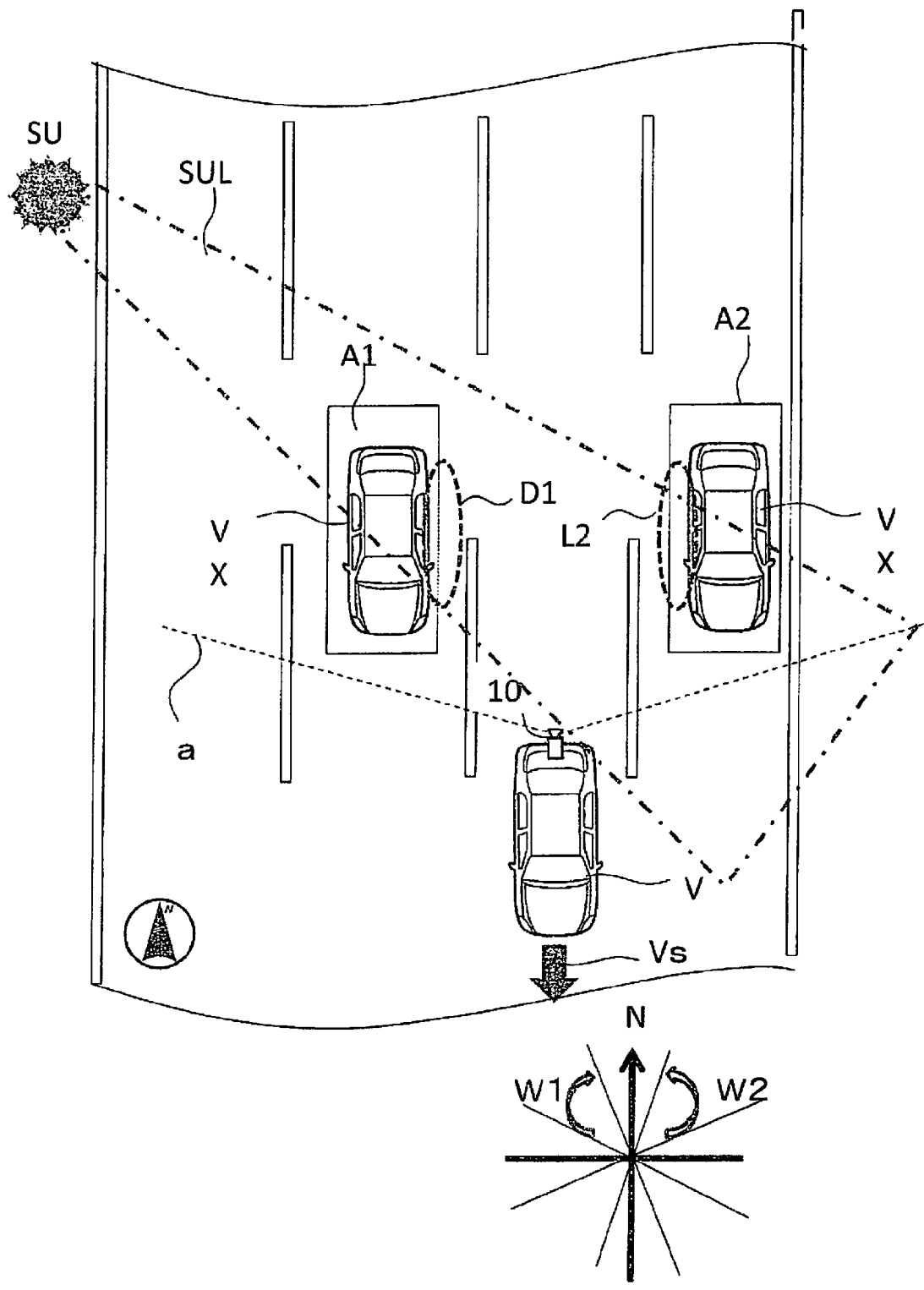
FIG. 20B is a view for describing a high-luminance area and a low-luminance area formed when sunlight comes into the detection area and another vehicle is present in the detection area.

FIGS. 20A and 20B are views for describing high-luminance areas formed in the detection area A1 and A2.

In the situation illustrated in FIG. 20A, a high-luminance area L1 is formed in the detection area A1 of the road surface when intense light SUL from the sun SU or another light source comes into the detection area A1 and is reflected on the road surface. Most of the reflected light in the high-luminance area L1 is incident on the lens of the camera 10 on the host vehicle V, and therefore information corresponding to the high-luminance area L1 is contained in the image information captured in this state. On the other hand, although a high-luminance area is formed in the same manner in the detection area A2 when intense light SUL from the sun SU, or the like, comes into the detection area A2 and is reflected, most of this reflected light is not incident on the lens of the camera 10 on the host vehicle V, and therefore a high-luminance area corresponding to the high-luminance area L1 in the detection area A1 is not formed in the detection area A2. Thus, in a situation in which sunlight SUL or other intense light comes into the detection area A1 or A2 from the side (from a direction excluding the front and the rear) of the host vehicle V, a high-luminance area L is formed in either one of the detection areas A1 and A2 resulting in a relatively bright environment, and a high-luminance area L is not formed in the other detection area resulting in a relatively dark environment.

Because reflected light from reflection of the sunlight or other intense light also is intense light, a luminance difference greater than or equal to a predetermined quantity arises in the surroundings of the area L1, and an edge in a so-called image processing technique is formed. The reflection image is continuously observed in the detection area A1 or A2 of the host vehicle V, barring a change of circumstances, such as the sun being cut off or light from another light source somehow being blocked, or changing of the traveling direction of the host vehicle V. The edge (pixels or pixel group in which the luminance difference is greater than or equal to a predetermined value) of the reflection image in the area L1 tends to appear along the direction in which the three-dimensional object collapses when being converted to a bird's-eye view image, and in this case the reflection image (virtual image) of the area L1 is assessed as having the characteristic of an image (real image) of a three-dimensional object. Because the reflection image of the area L1 is continuously observed in the detection area A1 or A2, a stable traveling speed is detected and tends to become a value smaller than the relative speed in relation to the host vehicle V. In this case, the reflection image (virtual image) in the area L1 may be assessed to have the characteristic of an image (real image) of another vehicle VX.

In the situation illustrated in FIG. 20B, another vehicle VX is present respectively in each of the detection areas A1 and A2, and intense light from the sun SU or other light source comes into the detection areas A1 and A2. In this case, the sunlight SUL is reflected on the right side of the other vehicle VX in the detection area A2 on the right side of the drawing and a high-luminance area is formed in the area L2. On the other hand, the light is reflected on an area from the right side to the rear of the other vehicle VX in the detection area A1 on the left side of the drawing, a shadow is produced on the left side of the other vehicle VX, and a low-luminance area is formed in the area D1. When images of the detection areas A1 and A2 are captured by the camera 10 on the host vehicle 10, a high-luminance area L2 caused by the reflection image (virtual image) is included in the detection area A2, and a low-luminance area D1 caused by the shadow of the other vehicle VX is included in the detection area A1. Thus, in a situation in which sunlight SUL or other intense light comes into the detection areas A1 and A2 from the side (from a direction excluding the front and the rear) of the host vehicle V and another vehicle VX is present respectively in each of the detection areas A1 and A2, either one of the detection areas A1 and A2 becomes a bright environment including a high-luminance area L and the other detection area becomes a dark environment not including a high-luminance area.

In the situation in FIG. 20B, intense reflected light arises in the detection area A2 when sunlight hits the right side (body) of the other vehicle VX. The luminance of the captured image in the detection area A2 shifts to high overall due to this reflected light, and therefore the value of the differential waveform information or edge information in the portion not corresponding to the characteristics of the other vehicle VX may be output larger, or the characteristics of the differential waveform information or edge information in the portion corresponding to the characteristics of the other vehicle VX may not be output clearly. On the other hand, when sunlight, or the like, hits from the left side to the rear of the other vehicle VX, the luminance in the detection area A1 shifts to low overall due to sunlight, or the like, being blocked, and therefore the value of the differential waveform information or edge information in the portion corresponding to the characteristics of the other vehicle VX may be output lower, or the characteristics of the differential waveform information or edge information in the portion corresponding to the characteristics of the other vehicle VX may not be output clearly.

In the-three-dimensional object detection device 1 according to the present invention, the threshold value used for processing to detect a three-dimensional object may be changed uniformly (without distinguishing between the detection areas A1 and A2) in order to control detection of a three-dimensional object. For example, when the lens is occluded by adhesion of foreign matter, control may be performed to lower the threshold value in order to promote detection of a three-dimensional object so that the three-dimensional object can be detected even with an occluded lens. However, when the threshold value is thus uniformly lowered in each control, the pixel value or a value calculated based on this pixel value of the reflection image caused by the above-described sunlight, or the like, may exceed the threshold value in the detection area A1 or A2 having a bright environment including a high-luminance area. In other words, the reflection image (virtual image) in the above-described area L1 may be erroneously detected as an image (real image) of a three-dimensional object or another vehicle VX. On the other hand, in the detection area A1 or A2 having a dark environment not including a high-luminance area or including a low-luminance area, the pixel value or a value calculated based on this pixel value of the image (real image) of another vehicle VX actually present may not exceed the threshold value. In other words, the image (real image) of the other vehicle VX actually present may be erroneously detected as an image or virtual image of a planar object or stationary object. In the present example, an example is described in which the light source is the sun and the intense light coming into the detection areas A1 and A2 is sunlight, but the light forming the high-luminance area is not particularly limited, and may be a headlight of another vehicle VX, a search light set up near the road, or an illuminating light for construction, or the like.

Therefore, in the three-dimensional object detection device 1 of the present embodiment, a first detection area including a high-luminance area is detected, assessment of a three-dimensional object detected based on image information of this first detection area as another vehicle VX is suppressed, and assessment of a three-dimensional object detected based on image information of a second detection area other than the first detection area as another vehicle VX is maintained or promoted.

The high-luminance area assessment unit 38 for assessing a first detection area is next described. The high-luminance area assessment unit 38 of the present embodiment assesses as a first detection area either one of the detection areas A1 and A2 that includes a high-luminance area complying with a predetermined reference, being either one of the detection areas A1 and A2 on the right side or the left side, and assesses as a second detection area a detection area other than the first detection area.

The "predetermined reference" used when assessing the high-luminance area is not particularly limited, but the high-luminance area assessment unit 38 of the present embodiment assesses as a high-luminance area an area in which pixels at or above a predetermined luminance are included at or above a predetermined density (pixel density) within the right-side and left-side detection areas A1 and A2. The high-luminance area can thereby be quantitatively assessed based on the value of the pixels. In the high-luminance area assessment unit 38 of the present embodiment, the "predetermined reference" can also be defined based on the percentage of the number of pixels of pixels at or above the predetermined luminance in a distribution of luminance values in the detection areas A1 and A2, the percentage of the number of pixels of pixels distributed within a predetermined threshold value centered on a peak in a distribution of luminance values in the detection areas A1 and A2, a degree of similarity when matched with a distribution graph defining a high-luminance area in a distribution of luminance values in the detection areas A1 and A2, and the like.

The high-luminance area assessment unit 38 of the present embodiment also assesses a first detection area based on the traveling direction and the direction in which the sun is present for each travel location of the host vehicle V. Specifically, the high-luminance area assessment unit 38 of the present embodiment detects a traveling direction and a travel location of the host vehicle V, and accessibly stores a correlation 381 having correlated in advance left and right identifiers (additional information for distinguishing the right-side detection area A1 and the left-side detection area A2) of a first detection area including a high-luminance area in relation to the traveling direction of the host vehicle V and the direction in which the sun is present. The high-luminance area assessment unit 38 also assesses in a predetermined cycle the direction in which the sun is present at a travel location from the detected travel location of the host vehicle V and calendar information 391 having correlated with the moment the direction in which the sun is present at each point. The high-luminance area assessment unit 38 also refers to the correlation 381 and assesses as a first detection area including a high-luminance area either one of the right-side detection area A1 or the left-side detection area A2, based on the direction in which the sun is present at the travel location and the traveling direction of the host vehicle V. The first detection area A1 or A2 including a high-luminance area can thereby be correctly detected in accordance with the environment based on the positional relationship between the host vehicle V and the sun.

In this case, the high-luminance area assessment unit 38 of the present embodiment preferably stores in advance a first correlation 381(1) referred to when a three-dimensional object is not detected in the detection area A1 or A2 by the three-dimensional object detection unit 33 or 37, and a second correlation 381(2) referred to when a three-dimensional object is detected in the detection area A1 or A2 by the three-dimensional object detection unit 33 or 37. This is because the detection area A1 or A2 in which the high-luminance area is formed differs depending on whether a three-dimensional object is present in the detection area A1 or A2, even when the sun is shining on the detection area A1 or A2 from the same direction. For example, as illustrated in FIG. 20A, when the sun SU is in the west, the first detection area including a high-luminance area is the right-side detection area A1 when three-dimensional objects are not present in the detection areas A1 and A2; but as illustrated in FIG. 20B, likewise when the sun SU is in the west, the first detection area including a high-luminance area is the left-side detection area A2 when three-dimensional objects are present in the detection areas A1 and A2.

No limitation is imposed in particular, but in the first correlation 381(1), which is applicable when a three-dimensional object is not present in the detection area A1 or A2, when the direction in which the sun is present is at a predetermined angle (for example, 100 degrees to 170 degrees clockwise; angle W1 in FIG. 20A) in relation to the traveling direction of the host vehicle, the correlation can be defined as that the first detection area is the right-side detection area A1, and the second detection area is the left-side detection area A2. Likewise, in the second correlation 381(2), which is applicable when a three-dimensional object is present in the detection area A1 or A2, when the direction in which the sun is present is at a predetermined angle (for example, 100 degrees to 170 degrees clockwise; angle W1 in FIG. 20B) in relation to the traveling direction of the host vehicle, the correlation can be defined as that the first detection area is the left-side detection area A2, and the second detection area is the left-side detection area A1. The detection area A1 or A2 including the high-luminance area can thereby be correctly assessed in accordance with the situation. The same applies also when the direction in which the sun is present is, for example, 100 degrees to 170 degrees counterclockwise (angle W2 illustrated in FIGS. 20A and B) in relation to the traveling direction of the host vehicle.

The high-luminance area assessment unit 38 of the present embodiment refers to the first correlation 381(1) when a detection result was acquired that the three-dimensional object detection unit 33 or 37 has not detected a three-dimensional object, refers to the second correlation 381(2) when a detection result was acquired that the three-dimensional object detection unit 33 or 37 detected a three-dimensional object, and assesses the first detection area A1 or A2 by the method described above.

The high-luminance area assessment unit 38 of the present embodiment carries out processing to determine the first detection area having referred to the above-described correlation 381, only when the height of the sun is less than a predetermined height. No limitation is imposed in particular, but when the height of the sun is at a predetermined height or lower, for example, at 65 degrees or lower, 40 degrees or lower, or 20 degrees or lower, the light coming into the detection areas A1 and A2 becomes more intense as with the western sun in Japan, and it can be considered as an environment in which a high-luminance area is easily formed. Specifically, the high-luminance area assessment unit 38 detects the travel location and the travel moment of the host vehicle V, refers to the calendar information 391 in which the height of the sun at each point is correlated with a moment, refers to the correlation 381 when the height in which the sun is present at the detected travel location of the host vehicle V is at the predetermined height or lower, and assesses the high-luminance area. In this case, the high-luminance area may be assessed referring to the correlation 381 when the height of the sun is within a moment of becoming at a predetermined value or lower (the moment of sunrise, the moment of sunset). Thus, in the present embodiment, because processing to determine the first detection area using the correlation 381 is performed in an environment in which the sun is low and a high-luminance area is easily formed, the processing cost can be reduced and the precision of detection of the first detection area can be improved.

In this connection, the travel location of the host vehicle V used in the present assessment is detected by a position detection device 50 equipped with a GPS (Global Positioning System) carried in the host vehicle V. The position detection device 50 used can be one that is carried in a navigation device in the host vehicle V. The traveling direction can be detected based on the change over time of the detected position. The calendar information having correlated with the moment the direction in which the sun is present at each point can be stored in advance in the controller 39.

The high-luminance area assessment unit 38 outputs to the controller 39 a left or right identifier of the right-side detection area A1 or the left-side detection area A2 assessed as the first detection area. The left and right identifiers are information for identifying the first detection area.

The controller 39 is next described. The controller 39 of the present embodiment generates a control command to be executed in the three-dimensional object detection unit 33 or 37, or the three-dimensional object assessment unit 34, when it was assessed by the high-luminance area assessment unit 38 that "either one of the right-side detection area A1 or the left-side detection area A2 includes a high-luminance area complying with a predetermined reference," and when the left or right identifier of the first detection area was acquired.

The controller 39 of the present embodiment suppresses assessment that a detected three-dimensional object is another vehicle VX based on image information of the first detection area A1 or A2 including the assessed high-luminance area, and maintains or promotes assessment that a detected three-dimensional object is another vehicle VX based on image information of a second detection area other than the first detection area within the right-side detection area A1 or the left-side detection area A2.

A control command of the present embodiment is an instruction for controlling the operation of each unit to suppress detection of a three-dimensional object from image information of the first detection area A1 or A2 and assessment that the detected three-dimensional object is another vehicle VX, and to maintain or promote detection of a three-dimensional object from image information of the second detection area A1 or A2 and assessment that the detected three-dimensional object is another vehicle VX. This is done in order to prevent erroneous detection of another vehicle VX based on an image in the detection area A1 or A2 that includes a high-luminance area. Because the computer 30 of the present embodiment is a computer, the control commands for processing to detect a three-dimensional object and processing to determine a three-dimensional object may be incorporated in advance in a program for each processing, and may be sent during execution. The control command of the present embodiment may be an instruction aiming for a result of discontinuing processing to determine as another vehicle a three-dimensional object detected based on image information of the first detection area, or a result of assessing that the detected three dimensional object is not another vehicle; or may be an instruction to decrease the sensitivity when detecting a three-dimensional object based on differential waveform information generated from image information of the first detection, or an instruction to adjust the sensitivity when detecting a three-dimensional object based on edge information generated from image information of the first detection area.

In the present embodiment, the image information as object of control is further narrowed down, and assessment of a detected three-dimensional object as another vehicle VX based on image information corresponding to a high-luminance area contained in the first detection area, rather than the entirety of the first detection area, is suppressed. Thus, detection suppression control can be performed adjusting the detection sensitivity only for image information corresponding to a reflection image caused by sunlight, and therefore another vehicle VX can be detected with ordinary detection sensitivity in a portion not subject to the influence of sunlight, and therefore the precision of detection of the other vehicle VX can be improved.

Each control command output by the controller 39 is described. The control commands used when detecting a three-dimensional object based on differential waveform information are first described. The three-dimensional object detection unit 33 detects a three-dimensional object based on differential waveform information and a first threshold value α. The controller 39 of the present embodiment outputs to the three-dimensional object detection unit 33 a control command to increase the first threshold value α used when processing image information of the first detection area or image information of the high-luminance area within the first detection area when the first detection area was assessed by the high-luminance area assessment unit 38. The first threshold value α is a first threshold value α for assessing the peak in the differential waveform $DW_t$ in step S7 illustrated in FIG. 11 (see FIG. 5). The controller 39 outputs to the three-dimensional object detection unit 33 a control command to maintain at the same value or to reduce the first threshold value α used when processing image information of the second detection area. The controller 39 also outputs to the three-dimensional object detection unit 33 a control command to increase the threshold value p related to the difference of pixel values in the differential waveform information.

The controller 39 assesses that there is a possibility that an image in a high-luminance area formed within the detection area A1 or A2 may be detected as information indicating the presence of a three-dimensional object when the first detection area is assessed. When a three-dimensional object is detected with uniform detection sensitivity in this condition, the high-luminance area reflected by sunlight or other intense light may be erroneously detected as the image of another vehicle VX traveling in the detection area A1 or A2, despite the fact that another vehicle VX is not present in the first detection area A1 or A2. Therefore, the controller 39 increases the first threshold value α, or the threshold value p related to the difference of pixel values when generating differential waveform information, so that the three-dimensional object is not detected in the first detection area. Thus, the threshold value for assessment is increased only for processing of image information of the first detection area, and the threshold value for assessment is maintained for decreased for processing of image information of the second detection area, whereby erroneous detection of an image in a high-luminance area formed in the first detection area as another vehicle VX can be prevented, and another vehicle VX can be detected at a suitable threshold value also in a second detection area in which a high-luminance area is not formed.

The controller 39 of the present embodiment can output to the three-dimensional object detection unit 33 a control command to output lower a value obtained by counting the number of pixels indicating a predetermined difference on a differential image of bird's-eye view images in the first detection area A1 or A2 and forming a frequency distribution, and to output the same or higher a value obtained by counting the number of pixels indicating a predetermined difference on a differential image of bird's-eye view images in the first detection area A1 or A2 and forming a frequency distribution, when a first detection area A1 or A2 was detected by the high-luminance area assessment unit 38. The value obtained by counting the number of pixels indicating a predetermined difference on the differential image of the bird's-eye view images and forming a frequency distribution is a value on the vertical axis of the differential waveform $DW_t$ generated in step S5 in FIG. 11. Because it is assessed that a high-luminance area is formed in the detection area A1 or A2 when receiving the assessment result of the first detection area A1 or A2, the controller 39 decreases the value obtained by forming a frequency distribution of the differential waveform $DW_t$ so that it is more difficult to detect a three-dimensional object from the image information of this first detection area. Thus, the detection sensitivity can be adjusted for each detection area by decreasing the output value based on the image information of the first detection area A1 or A2 and maintaining or increasing the output value of the image information of the first detection area A1 or A2. Therefore, it is possible to prevent erroneous detection of an image in the high-luminance area in the first detection area A1 or A2 as another vehicle VX, and to prevent erroneous detection that a three-dimensional object in the second detection area A1 or A2 is not a three-dimensional object.

The control commands for detecting a three-dimensional object based on edge information are next described. The controller 39 of the present embodiment outputs to the three-dimensional object detection unit 37 a control command to increase a predetermined threshold value related to luminance used when detecting edge information based on image information of the first detection area A1 or A2, and to maintain or decrease the predetermined threshold value related to luminance used when detecting edge information based on image information of the second detection area A1 or A2, when a first detection area A1 or A2 is assessed by the high-luminance area assessment unit 38. The predetermined threshold value related to luminance used when detecting edge information is the threshold value θ used when assessing the value having normalized the sum of the continuities c of the attributes of the attention points Pa in step S29 in FIG. 17, or the second threshold value β for evaluating the quantity of edge lines in step 34 in FIG. 18. The controller 39 can output a control command to the three-dimensional object detection unit 33 to increase the threshold value θ used when detecting edge lines or the second threshold value β for evaluating the quantity of edge lines based on image information of the first detection area A1 or A2, and to maintain or decrease the threshold value θ used when detecting edge lines or the second threshold value β for evaluating the quantity of edge lines based on image information of the second detection area A1 or A2. Thus, the threshold value for assessment is increased only for the first detection area, and the threshold value for assessment is maintained for decreased for the second detection area, whereby erroneous detection of an image in a high-luminance area formed in the first detection area A1 or A2 as another vehicle VX can be prevented, and another vehicle VX can be detected at a suitable threshold value also in a second detection area in which a high-luminance area is not formed.

The controller 39 of the present embodiment outputs to the three-dimensional object detection unit 37 a control command to output lower the quantity of edge information detected from the first detection area A1 or A2, and to maintain or output higher the quantity of edge information detected from the second detection area A1 or A2, when the first detection area A1 or A2 was assessed by the high-luminance area assessment unit 38. The quantity of edge information detected is a value having normalized the sum of the continuities c of the attributes of the attention points Pa in step S29 in FIG. 17, or the quantity of edge lines in step 34 in FIG. 18. When the first detection area A1 or A2 is detected, the controller 39 decreases the value having normalized the sum of the continuities c of the attributes of the attention points Pa or the quantity of edge lines of the image information of the first detection area A1 or A2, and maintains or increases the value having normalized the sum of the continuities c of the attributes of the attention points Pa or the quantity of edge lines of the image information of the second detection area A1 or A2. Thus, the detection sensitivity can be adjusted for each detection area by decreasing the output value based on the image information of the first detection area A1 or A2 and maintaining or increasing the output value based on the image information of the first detection area A1 or A2. Therefore, it is possible to prevent erroneous detection of an image in a high-luminance area formed in the first detection area A1 or A2 as another vehicle VX, and to prevent erroneous detection of a three-dimensional object in the second detection area A1 or A2 as not being a three-dimensional object.

The three-dimensional object detection device 1 of the present embodiment increases a threshold value or decreases an output value for processing to detect a three-dimensional object based on the first detection area A1 or A2, and decreases a threshold value or increases an output value for processing to detect a three-dimensional object based on the second detection area A1 or A2. Therefore, in the first detection area A1 or A2 having a bright environment, it is possible to prevent erroneous detection of a reflection image (virtual image) of sunlight or other intense light as an image (real image) of another image traveling in an adjacent lane adjacent to the lane in which the host vehicle is traveling, while in the second detection area A1 or A2 having a dark environment, it is possible to prevent erroneous detection of an image (real image) of another vehicle actually present in an adjacent lane as not being another vehicle.

The three-dimensional object detection device 1 of the present embodiment also increases the threshold value or decreases the output value for processing to detect a three-dimensional object based on the first detection area A1 or A2, and decreases the threshold value or increases the output value for processing to detect a three-dimensional object based on the second detection area A1 or A2. Therefore, in the first detection area A1 or A2 in which the detected luminance is high due to light reflected by the body of another vehicle VX, or the like, the reflected light (real image) of a three-dimensional object output on the high side can be correctly detected as the image (real image) of another vehicle traveling in an adjacent lane adjacent to the lane in which the host vehicle is traveling, while in the second detection area A1 or A2 in which the detected luminance is low due to blocking of the light by the body of another vehicle VX, or the like, the reflected light (real image) of a three-dimensional object output on the low side can be correctly detected as the image (real image) of another vehicle actually present in an adjacent lane.

The control procedure of the three-dimensional object detection device 1 of the present embodiment is described below with reference to FIG. 21.

Figure 21:
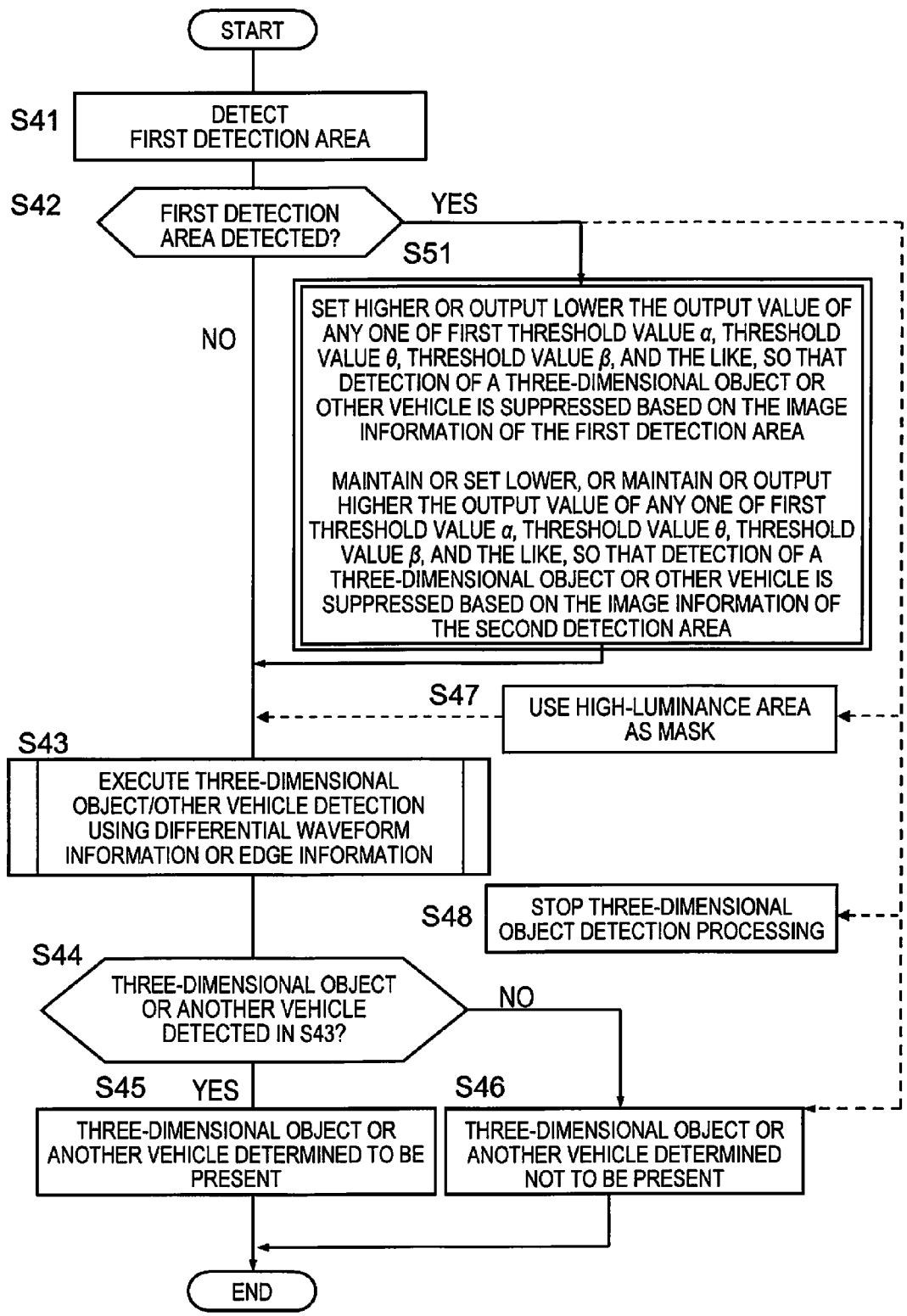
FIG. 21 is a flowchart illustrating the control procedure of the three-dimensional object detection device of the present embodiment.

First, in step S41 illustrated in FIG. 21, the high-luminance area assessment unit 38 detects a first detection area A1 or A2 including a high-luminance area, and assesses this as a first detection area A1 or A2. The high-luminance area assessment unit 38 detects a high-luminance area complying with a predetermined reference based on the image information of the detection area A1 or A2, and detects and assesses a detection area A1 or A2 as a first detection area A1 or A2 including the high-luminance area when this high-luminance area is included in either of the detection area A1 and A2 on the left and the right. The left-side detection area A2 is a second detection area when the right-side detection area A1 is assessed to be the first detection area.

When the first detection area A1 or A2 was detected in step S42, in other words, when the result of assessment of the first detection area A1 or A2 was output, the process proceeds to step S51. When the first detection area A1 or A2 was not detected, in other words, when an assessment result that the first detection area A1 or A2 was not detected was output, the process proceeds to step S43.

In step S51, the controller 39 increases (changes so that detection becomes more difficult) each threshold value used in each process over the initial value, standard value, or other set value, or decreases (changes so that detection becomes more difficult) the output value compared with each threshold value, in order to suppress detection of a three-dimensional object by the three-dimensional object detection unit 33 or 37, or to suppress assessment that a three-dimensional object is assessed to be another vehicle by the three-dimensional object assessment unit 37. When the controller 39 carries out promotion processing, promotion processing becomes the control assessed as suppression processing.

The specific details of the processing are as follows.

When the three-dimensional object detection unit 33 used for detecting a three-dimensional object using differential waveform information detects a three-dimensional object when the differential waveform information is at or above a predetermined first threshold value $\alpha$, the controller 39 generates a control command to increase the first threshold value $\alpha$ so that detection of a three-dimensional object is more difficult to detect, and outputs the control command to the three-dimensional object detection unit 33.

Likewise, when the three-dimensional object detection unit 33 detects a three-dimensional object when the differential waveform information is at or above a predetermined first threshold value $\alpha$, the controller 39 generates a control command to output lower the value obtained by counting the number of pixels indicating a predetermined difference on the differential image in the bird's-eye view image and forming a frequency distribution, and outputs the control command to the three-dimensional object detection unit 33.

When the three-dimensional object detection unit 33 used for detecting a three-dimensional object using differential waveform information extracts a number of pixels indicating a pixel value at or above a threshold value p as a number of pixels indicating a predetermined difference, the controller 39 generates a control command to increase the threshold value p so that a three-dimensional object is more difficult to detect, and outputs the control command to the three-dimensional object detection unit 33.

Likewise, when the three-dimensional object detection unit 33 extracts a number of pixels indicating a pixel value at or above a threshold value p as a number of pixels indicating a predetermined difference, the controller 39 generates a control command to output lower the number of pixels extracted on the differential image along the direction in which the three-dimensional object collapses when being converted to a bird's-eye view image, and outputs the control command to the three-dimensional object detection unit 33.

When the three-dimensional object detection unit 37 used for detecting a three-dimensional object using edge information extracts an edge line based on pixels indicating a luminance difference greater than or equal to a predetermined threshold value t, the controller 39 generates a control command to increase the predetermined threshold value t so that a three-dimensional object is more difficult to detect, and outputs the control command to the three-dimensional object detection unit 37.

Likewise, when the three-dimensional object detection unit 37 used for detecting a three-dimensional object using edge information extracts an edge line based on pixels indicating a luminance difference greater than or equal to a predetermined threshold value t, the controller 39 generates a control command to output lower the luminance value of the pixel, and outputs the control command to the three-dimensional object detection unit 37.

When the three-dimensional object detection unit 37 used for detecting a three-dimensional object using edge information detects a three-dimensional object based on an edge line having a length greater than or equal to a predetermined threshold value θ, the controller 39 generates a control command to increase the threshold value θ so that a three-dimensional object is more difficult to detect, and outputs the control command to the three-dimensional object detection unit 37.

Likewise, when the three-dimensional object detection unit 37 used for detecting a three-dimensional object using edge information detects a three-dimensional object based on an edge line having a length greater than or equal to a predetermined threshold value θ, the controller 39 generates a control command to output lower the value of the length of the edge line in the detected edge line, and outputs the control command to the three-dimensional object detection unit 37.

When the three-dimensional object detection unit 37 used for detecting a three-dimensional object using edge information detects a three-dimensional object based on an assessment that the number of edge lines having a predetermined length or longer included in the edge information, for example, edge lines having a length greater than or equal to a threshold value θ, is greater than or equal to a second threshold value β, the controller 39 generates a control command to increase the second threshold value β so that a three-dimensional object is more difficult to detect, and outputs the control command to the three-dimensional object detection unit 37.

When the three-dimensional object detection unit 37 used for detecting a three-dimensional object using edge information detects a three-dimensional object based on an assessment that the number of edge lines having a predetermined length or longer included in the edge information, for example, edge lines having a length greater than or equal to a threshold value θ, is greater than or equal to a second threshold value β, the controller 39 generates a control command to output lower the detected number of edge lines having a predetermined length or longer, and outputs the control command to the three-dimensional object detection unit 37.

When the three-dimensional object assessment unit 34 assesses a detected three-dimensional object as another vehicle when the traveling speed of this three-dimensional object is greater than or equal to a predetermined speed set in advance, the controller 39 generates a control command to increase the predetermined speed serving as the lower limit when assessing a three-dimensional object as another vehicle so that a three-dimensional object is more difficult to detect, and outputs the control command to the three-dimensional object assessment unit 34.

Likewise, when the three-dimensional object assessment unit 34 assesses a detected three-dimensional object as another vehicle when the traveling speed of this three-dimensional object is greater than or equal to a predetermined speed set in advance, the controller 39 generates a control command to output lower the traveling speed of the three-dimensional object to be compared with the predetermined speed serving as the lower limit when assessing a three-dimensional object as another vehicle, and outputs the control command to the three-dimensional object assessment unit 34.

When the three-dimensional object assessment unit 34 assesses a detected three-dimensional object as another vehicle when the traveling speed of this three-dimensional object is less than a predetermined speed set in advance, the controller 39 generates a control command to decrease the predetermined speed serving as the upper limit when assessing a three-dimensional object as another vehicle, and outputs the control command to the three-dimensional object assessment unit 34.

Likewise, when the three-dimensional object assessment unit 34 assesses a detected three-dimensional object as another vehicle when the traveling speed of this three-dimensional object is less than a predetermined speed set in advance, the controller 39 generates a control command to increase the traveling speed of the three-dimensional object to be compared with the predetermined speed serving as the upper limit when assessing a three-dimensional object as another vehicle, and outputs the control command to the three-dimensional object assessment unit 34.

"Traveling speed" here includes the absolute speed of the three-dimensional object and the relative speed of the three-dimensional object in relation to the host vehicle. The absolute speed of the three-dimensional object may be calculated from the relative speed of the three-dimensional object, and the relative speed of the three-dimensional object may be calculated from the absolute speed of the three-dimensional object.

In this connection, the first threshold value α is the threshold value for assessing the peak in the differential waveform $DW_t$ in step S7 in FIG. 11. The threshold value p is the threshold value for extracting pixels having a predetermined pixel value. The predetermined threshold value t is the threshold value for extracting pixels or edge components having a predetermined luminance difference. The threshold value θ is the threshold value for assessing the value (length of the edge) obtained by normalizing the sum of the continuities c of the attributes of the attention points Pa in step S29 in FIG. 17, and the second threshold value β is the threshold value for evaluating the quantity (number) of edge lines in step 34 in FIG. 18. Thus, by increasing the threshold value for assessment, the detection sensitivity can be adjusted so that it is more difficult to detect another vehicle VX traveling adjacent to the lane in which the host vehicle V is traveling, and erroneous detection of another vehicle VX therefore can be prevented.

The controller 39 of the present embodiment outputs to the three-dimensional object detection unit 33 a control command to output lower the value obtained by counting the number of pixels indicating a predetermined difference on the differential image in the bird's-eye view image and forming a frequency distribution. The value obtained by counting the number of pixels indicating a predetermined difference on the differential image in the bird's-eye view image and forming a frequency distribution is the value on the vertical axis of the differential waveform $DW_t$ generated in step S5 in FIG. 11. The controller 39 of the present embodiment also outputs to the three-dimensional object detection unit 37 a control command to output lower the detected edge information. The detected edge information is the length of the edge line that is the value obtained by normalizing the sum of the continuities c of the attributes of the attention points Pa in step S29 in FIG. 17, as well as the quantity of edge lines in step 34 in FIG. 18. The controller 39 decreases the value obtained by normalizing the sum of the continuities c of the attributes of the attention points Pa, or the quantity of edge lines, so that a three-dimensional object is more difficult to detect in the next round of processing. Thus, by decreasing the output value, the detection sensitivity can be adjusted so that it is more difficult to detect another vehicle VX traveling adjacent to the lane in which the host vehicle V is traveling, and erroneous detection of another vehicle VX traveling in an adjacent lane therefore can be prevented.

As described above, the controller 39 of the present embodiment increases each threshold value (first threshold value α, threshold value θ, and second threshold value β), and/or decreases the output value, so that assessment of a three-dimensional object detected based on image information of a first detection area A1 or A2 as another vehicle VX is suppressed. The object of this processing may be image information of the entirety of the first detection area, or may be an image area corresponding to a high-luminance area within the image information of the entirety of the first detection area. Each threshold value (first threshold value α, threshold value θ, and second threshold value β) is increased as the luminance (maximum luminance, average luminance, or standard luminance) of the high-luminance area is greater.

Figure 22:
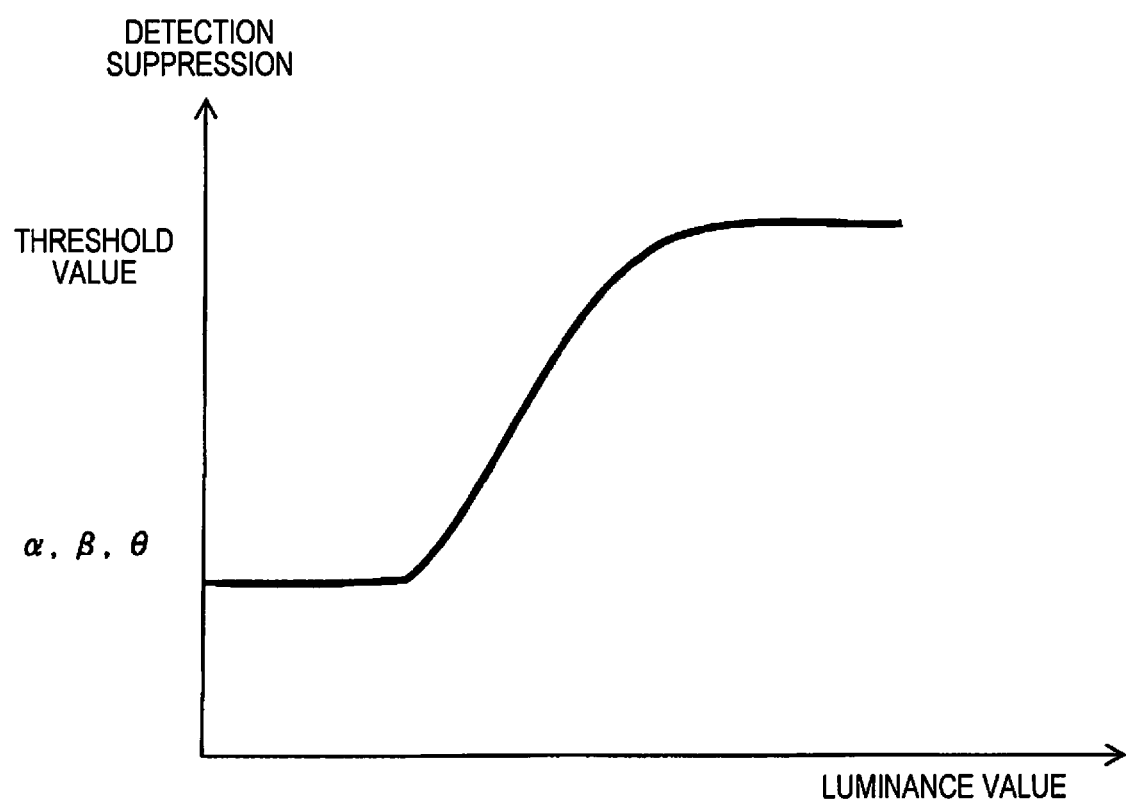
FIG. 22 is a view illustrating an example of the relationship between the high-luminance area and the threshold value.

FIG. 22 illustrates an example of the relationship between this luminance value and each threshold value. The edges, or the like, of a virtual image produced by reflection of incoming sunlight or other intense light appears more distinctly as the luminance of the high-luminance area is higher. Thus, by adjusting each threshold value in accordance with the luminance of the high-luminance area, detection of another vehicle is more firmly suppressed when the luminance of the high-luminance area is high, and the precision of detection of a three-dimensional object can be maintained.

In the same step S51, the controller 39 maintains at the same value or decreases each threshold value (first threshold value α, threshold value θ, and second threshold value β), and/or maintains at the same value or increases the output value, so that assessment of a three-dimensional object detected based on image information of a second detection area A1 or A2 as another vehicle VX is maintained or promoted. The object of this processing is image information of the entirety of the second detection area. Once the threshold value is set in step S51, the process proceeds to step S43.

When the first detection area A1 or A2 was detected in step S42, in other words, when it was assessed that there is a high-luminance area, the process proceeds to step S47, the image information of this high-luminance area is masked (excluded from processing), and the process proceeds to step S43. When the first detection area A1 or A2 was detected in step S42 and the result of assessment of the first detection area A1 or A2 was output, the process may proceed to step S48 and the present round of processing to detect a three-dimensional object may be stopped.

In the next step S43, the three-dimensional object detection device 1 carries out processing to detect a three-dimensional object. This processing to detect a three-dimensional object is carried out in accordance with the process using differential waveform information in FIGS. 11 and 12 that is carried out by the three-dimensional object detection unit 33, or the process using edge information in FIGS. 17 and 18 that is carried out by the three-dimensional object detection unit 37. When a three-dimensional object was detected in a detection area A1 or A2 by the three-dimensional object detection unit 33 or 37 in step 44, the process proceeds to step S45 and it is assessed that the detected three-dimensional object is another vehicle VX. On the other hand, when a three-dimensional object is not detected in a detection area A1 or A2 by the three-dimensional object detection unit 33 or 37, the process proceeds to step 47 and it is assessed that another vehicle VX is not present in the detection area A1 or A2.

The three-dimensional object detection device 1 of the present embodiment of the present invention, which is configured and operates as above, realizes the following effects.

(1) With the three-dimensional object detection device 1 of the present embodiment, when the brightness environment differs between a right-side detection area A1 and a left-side detection area A2, in the first detection area A1 or A2 having a bright environment, it is possible to prevent erroneous detection of a reflection image (virtual image) of sunlight or other intense light as an image (real image) of another image traveling in an adjacent lane adjacent to the lane in which the host vehicle is traveling, while in the second detection area A1 or A2 having a dark environment, it is possible to prevent erroneous detection of an image (real image) of another vehicle actually present in an adjacent lane as not being another vehicle.

With the three-dimensional object detection device 1 of the present embodiment, when different brightness environments are formed by the presence of a three-dimensional object between the right-side detection area A1 and the left-side detection area A2, in the first detection area A1 or A2 in which the detected luminance is high due to light reflected by the body of the other vehicle VX, or the like, the reflected light (real image) of a three-dimensional object output on the high side can be correctly detected as the image (real image) of another vehicle traveling in an adjacent lane adjacent to the lane in which the host vehicle is traveling; meanwhile in the second detection area A1 or A2 in which the detected luminance is low due to blocking of the light by the body of another vehicle VX, or the like, the reflected light (real image) of a three-dimensional object output on the low side can be correctly detected as the image (real image) of another vehicle actually present in an adjacent lane.

As a result, there can be provided a three-dimensional object detection device that detects with high precision another vehicle traveling in an adjacent lane adjacent to the lane in which the host vehicle is traveling. This effect is realized in the same manner whether the other vehicle VX is detected based on differential waveform information or whether the other vehicle VX is detected based on edge information.

(2) According to the three-dimensional object detection device 1 of the present embodiment, a first detection area A1 or A2 including a high-luminance area can be quantitatively detected based on the value of pixels of image information in the first detection area A1 or A2.

(3) According to the three-dimensional object detection device 1 of the present embodiment, a first detection area A1 or A2 including a high-luminance area can be detected based on circumstances based on a positional relationship between the host vehicle V and the sun.

(4) According to the three-dimensional object detection device 1 of the present embodiment, a first detection area A1 or A2 including a high-luminance area can be accurately detected and assessed based on circumstances based on a positional relationship between the host vehicle V and the sun, by preparing a first correlation when a three-dimensional object is not detected and a second correlation when a three-dimensional object is detected.

(5) According to the three-dimensional object detection device 1 of the present embodiment, processing to detect and determine the first detection area referring to the correlation 381 is carried out when the height of the sun is less than a predetermined height. Therefore, processing to determine the first detection area using the correlation 381 is carried out when the height of the sun is low and the light coming into the detection area A1 or A2 is intense (when the western sun in Japan comes in). Therefore, the processing cost can be reduced and the precision of detection of the first detection area can be improved.

(6) According to the three-dimensional object detection device 1 of the present embodiment, the image information as object of control can be further narrowed down by suppressing assessment of a detected three-dimensional object as another vehicle VX based on image information corresponding to a high-luminance area contained in the first detection area. Therefore, another vehicle VX can be detected with ordinary detection sensitivity in a portion not subject to the influence of sunlight, and therefore the precision of detection of the other vehicle VX can be improved.

(7) According to the three-dimensional object detection device 1 of the present embodiment, the first threshold value α is increased when a first detection area A1 or A2 was detected, whereby the detection sensitivity can be adjusted so that it is more difficult to detect another vehicle VX traveling adjacent to the lane in which the host vehicle is traveling, and therefore erroneous detection of an image of a high-luminance area formed in the first detection area A1 or A2 as another vehicle VX traveling in an adjacent lane can be prevented.

(8) According to the three-dimensional object detection device 1 of the present embodiment, the output value when generating differential waveform information is decreased when a first detection area A1 or A2 was detected and assessed, whereby the detection sensitivity can be adjusted so that it is more difficult to detect another vehicle VX traveling adjacent to the lane in which the host vehicle V is traveling, and therefore erroneous detection of an image of a high-luminance area formed in the first detection area A1 or A2 as another vehicle VX traveling in an adjacent lane can be prevented.

(9) According to the three-dimensional object detection device 1 of the present embodiment, the threshold value for assessment when generating edge information is increased when the first detection area A1 or A2 was detected and assessed, whereby the detection sensitivity can be adjusted so that it is more difficult to detect another vehicle VX traveling adjacent to the lane in which the host vehicle is traveling, and therefore erroneous detection of an image of a high-luminance area formed in the first detection area A1 or A2 as another vehicle VX traveling in an adjacent lane can be prevented.

(10) According to the three-dimensional object detection device 1 of the present embodiment, the output value when generating edge information is decreased when the first detection area A1 or A2 was detected and assessed, whereby the detection sensitivity can be adjusted so that it is more difficult to detect another vehicle VX traveling adjacent to the lane in which the host vehicle V is traveling, and therefore erroneous detection of an image of a high-luminance area formed in the first detection area A1 or A2 as another vehicle VX traveling in an adjacent lane can be prevented.

The same operation and effects as of the three-dimensional object detection device 1 described above can be obtained also in the method for detecting a three-dimensional object in the present embodiment.

The abovementioned camera 10 corresponds to the image capturing means according to the present invention, the conversion unit 31 corresponds to the image conversion means according to the present invention, the alignment unit 32 and three-dimensional object detection unit 33 correspond to the three-dimensional object detection means according to the present invention, the luminance difference calculation unit 35, edge line detection unit 36, and three-dimensional object detection unit 37 correspond to the three-dimensional object detection means according to the present invention, the three-dimensional object assessment unit 34 corresponds to the three-dimensional object assessment means, the high-luminance area assessment unit 38 corresponds to the high-luminance area assessment means, and the controller 39 corresponds to the control means.

The alignment unit 21 in the present embodiment aligns the positions of bird's-eye view images of different points in time on a bird's-eye view, and the aligned bird's-eye view is obtained, but this "alignment" processing can be performed with precision corresponding to the kind of object detected or the precision of detection. Strict alignment processing may be performed, in which alignment is based on identical points in time and identical positions, or alignment processing relaxed to a certain degree may be performed, in which the coordinates of each bird's-eye view are grasped.

The invention claimed is:

1. A three-dimensional object detection device comprising:
    an image capturing unit configured to capture images of an area including a right-side detection area or a left-side detection area rearward of a vehicle;
    a three-dimensional object detection unit programmed to detect a three-dimensional object based on the images acquired by the image capturing unit;
    a high-luminance area assessment unit programmed to assess whether one of the right-side detection area and the left-side detection area includes a high-luminance area complying with a predetermined reference, and—if one of the right-side detection area and the left-side detection area includes the high-luminance area—to selectively designate the one of the right-side detection area and the left-side detection area as a first detection area and the other of the right-side detection area and the left-side detection area as a second detection area, the high-luminance area corresponding to a bright environment illuminated by light; and
    a controller programmed to selectively suppress detection of the three-dimensional object based on image information of the first detection area, and to maintain or promote detection of the three-dimensional object based on image information of the second detection area.

2. The three-dimensional object detection device according to claim 1, wherein
    the high-luminance area assessment unit is programmed to assess whether one of the right-side detection area and the left-side detection area will be designated as the first detection area by determining whether one of the right-side detection area and the left-side detection area in which pixels at or above a predetermined luminance exist at or above a predetermined density within the right-side detection area or the left-side detection area.

3. The three-dimensional object detection device according to claim 1, wherein
    the controller is programmed to suppress assessment that the three-dimensional object that was detected is another vehicle based on image information corresponding to the one of the right-side detection area and the left-side detection area that was designated as the first detection area.

4. A three-dimensional object detection device comprising:
an image capturing unit configured to capture images of an area including a right-side detection area or a left-side detection area rearward of a vehicle;
a three-dimensional object detection unit programmed to detect a three-dimensional object based on the images acquired by the image capturing unit;
a high-luminance area assessment unit programmed to assess a first detection area including a high-luminance area complying with a predetermined reference on either the right-side detection area or the left-side detection area;
an image conversion unit programmed to perform viewpoint conversion of the images obtained by the image capturing unit to bird's-eye view images;
a three-dimensional object assessment unit programmed to access whether the three-dimensional object detected by the three-dimensional object detection unit is another vehicle, the three-dimensional object detection unit being further programmed to detect a presence of the three-dimensional object in a detection area set on each of a right side and a left side rearward of the vehicle based on differential waveform information in which the differential waveform information is generated by aligning bird's-eye view positions of bird's-eye view images obtained at different points in time by the image conversion unit, and counting a number of pixels indicating a predetermined difference in a differential image on the bird's-eye view images that were aligned in which the predetermined difference is indicated by a luminance difference in the differential image along a direction of collapsing of the three-dimensional object when viewpoint conversion of the bird's-eye view images is performed to create a frequency distribution; and
a controller programmed to suppress detection of the three-dimensional object or assessment that the three-dimensional object is another vehicle based on image information of the detected first detection area, and to maintain or promote detection of the three-dimensional object or assessment that the three-dimensional object is another vehicle based on image information of a second detection area other than the first detection area within the right-side detection area or the left-side detection area.

5. The three-dimensional object detection device according to claim 4, wherein
the three-dimensional object detection unit is further programmed to detect the three-dimensional object based on the differential waveform information and a first threshold value α; and
when the first detection area is assessed by the high-luminance area assessment unit, the controller is programmed to output to the three-dimensional object detection unit a control command for upwardly adjusting the first threshold value α when performing three-dimensional object detection processing based on image information corresponding to the first detection area so that the three-dimensional object is difficult to detect, and downwardly adjusting or maintaining at the same value the first threshold value α when performing three-dimensional object detection processing based on image information corresponding to the second detection area so that the three-dimensional object is easy to detect.

6. The three-dimensional object detection device according to claim 4, wherein
when the first detection area was assessed by the high-luminance area assessment unit, the controller is programmed to output to the three-dimensional object detection unit a control command for outputting a downwardly adjusted value obtained by counting the number of the pixels indicating a predetermined difference on the differential image of the bird's-eye view image and forming the frequency distribution in a three-dimensional object detection process based on image information corresponding to the first detection area, and to output an upwardly adjusted, or the same value, obtained by counting the number of the pixels indicating the predetermined difference in the differential image of the bird's-eye view images and forming the frequency distribution in the three-dimensional object detection process based on image information corresponding to the second detection area.

7. A three-dimensional object detection device comprising:
an image capturing unit configured to capture images of an area including a right-side detection area or a left-side detection area rearward of a vehicle;
a three-dimensional object detection unit programmed to detect a three-dimensional object based on the images acquired by the image capturing unit;
a high-luminance area assessment unit programmed to assess a first detection area including a high-luminance area complying with a predetermined reference on either the right-side detection area or the left-side detection area;
an image conversion unit programmed to perform viewpoint conversion of the images obtained by the image capturing unit to bird's-eye view images;
a three-dimensional object assessment unit programmed to access whether a three-dimensional object detected by the three-dimensional object detection unit is another vehicle, the three-dimensional object detection unit being further programmed to detect a presence of the three-dimensional object based on edge information derived from an edge component that is detected, on the bird's-eye view images obtained by the image conversion unit, the edge component including pixels in which a luminance difference between mutually adjacent image areas is greater than or equal to a predetermined difference along a direction of collapsing of the three-dimensional object is used, when viewpoint conversion of the bird's-eye view images is performed, to detect the presence of the three-dimensional object based on the edge information derived from the edge component; and
a controller programmed to suppress detection of the three-dimensional object or assessment that the three-dimensional object is another vehicle based on image information of the detected first detection area, and to maintain or promote detection of the three-dimensional object or assessment that the three-dimensional object is another vehicle based on image information of a second detection area other than the first detection area within the right-side detection area or the left-side detection area.

8. The three-dimensional object detection device according to claim 7, wherein
the three-dimensional object detection unit is further programmed to detect the three-dimensional object based on the edge information and a second threshold value β; and when the first detection area is assessed by the high-luminance area assessment unit, the controller is programmed to output to the three-dimensional object detection unit a control command for upwardly adjusting a second threshold value β when performing three-dimensional object detection processing based on image information corresponding to the first detection area so that the three-dimensional object is difficult to detect, and downwardly adjusting or not changing a second threshold value β when performing three-dimensional object detection processing based on image information corresponding to the second detection area so that the three-dimensional object is easy to detect.

9. The three-dimensional object detection device according to claim 7, wherein
when the first detection area is assessed by the high-luminance area assessment unit, the controller is programmed to output to the three-dimensional object detection unit a control command to output a downwardly adjusted amount of edge information detected in three-dimensional object detection processing based on image information corresponding to the first detection area, and an upwardly adjusted, or the same, amount of edge information detected in three-dimensional object detection processing based on image information corresponding to the second detection area.

10. A three-dimensional object detection device comprising:
an image capturing unit configured to capture images of an area including a right-side detection area or a left-side detection area rearward of a vehicle;
a three-dimensional object detection unit programmed to detect a three-dimensional object based on the images acquired by the image capturing unit;
a high-luminance area assessment unit programmed to assess a first detection area including a high-luminance area complying with a predetermined reference on either the right-side detection area or the left-side detection area, the high-luminance area assessment unit is further programmed to execute:
acquiring a traveling direction and a travel location of the vehicle;
referencing a correlation obtained by associating left and right identifiers of a first detection area predicted to include a high-luminance area in a relationship between the traveling direction of the vehicle and a direction in which the sun is present; and
assessing that the first detection area includes the high-luminance area within the right-side detection area or the left-side detection area based on a direction in which the sun is present at the travel location that was acquired as assessed from the travel location that was acquired and calendar information that associates a direction in which the sun is present at individual travel locations and a point in time, and based on the acquired traveling direction at the acquired travel location of the vehicle; and
a controller programmed to suppress detection of the three-dimensional object based on image information of the first detection area that was detected, and to maintain or promote detection of the three-dimensional object based on image information of a second detection area other than the first detection area within the right-side detection area or the left-side detection area.

11. The three-dimensional object detection device according to claim 10, wherein
the correlation includes a first correlation for when a three-dimensional object has not been detected by the three-dimensional object detection unit and a second correlation for when a three-dimensional object has been detected by the three-dimensional object detection unit; and
the high-luminance area assessment unit is further programmed to access the first detection area by referencing the first correlation upon acquiring a detection result that the three-dimensional object detection unit has not detected a three-dimensional object, and referencing the second correlation upon acquiring a detection result that the three-dimensional object detection unit detected a three-dimensional object.

12. The three-dimensional object detection device according to claim 10, wherein
the high-luminance area assessment unit is further programmed to detect a travel time point of the vehicle, reference the calendar information associating a height of the sun at individual sites with a point in time, and reference the correlation to assess a high-luminance area when the height of the sun at the travel location of the vehicle detected is less than a predetermined height.

\* \* \* \* \*